United States Patent
Tran et al.

[11] Patent Number: 6,103,316
[45] Date of Patent: Aug. 15, 2000

[54] METHOD OF MAKING ELECTRON BEAM POLYMERIZED EMULSION-BASED ACRYLATE PRESSURE SENSITIVE ADHESIVES

[75] Inventors: Thu-Van T. Tran, Maplewood; Douglas E. Weiss, Golden Valley, both of Minn.

[73] Assignee: 3M Innovative Properties Company, St. Paul, Minn.

[21] Appl. No.: 09/118,590

[22] Filed: Jul. 17, 1998

[51] Int. Cl.$^7$ .............................. C08J 7/04; B05D 5/10
[52] U.S. Cl. .................. 427/505; 427/208.4; 427/385.5; 427/551; 427/595
[58] Field of Search ................... 427/505, 551, 427/595, 208.4, 385.5

[56] References Cited

U.S. PATENT DOCUMENTS

| | | | |
|---|---|---|---|
| 3,303,174 | 2/1967 | Lanthier | 260/89.1 |
| 3,661,618 | 5/1972 | Brookman et al. | 172/62 |
| 3,772,063 | 11/1973 | Fukukawa et al. | 117/93.31 |
| 4,130,523 | 12/1978 | Hoy et al. | 260/29.6 |
| 4,139,437 | 2/1979 | Araki et al. | 204/159.16 |
| 4,144,155 | 3/1979 | Araki et al. | 204/159.16 |
| 4,181,752 | 1/1980 | Martens et al. | 427/54.1 |
| 4,371,659 | 2/1983 | Druschke et al. | 524/599 |
| 4,554,324 | 11/1985 | Husman et al. | |
| 4,590,238 | 5/1986 | Furomoto et al. | 524/745 |
| 4,810,523 | 3/1989 | Williams et al. | 427/36 |

FOREIGN PATENT DOCUMENTS

WO 95/20634   8/1995   WIPO.
WO 97/05171   2/1997   WIPO.

OTHER PUBLICATIONS

Gopinathan, C., Balin, T., *Development of Gamma Radiation Processed Pressure Sensitive Adhesives*, Bhabha Atomic Research Centre, Trombay, Bombay, India, RadTech Asia '93 UV/EB Conf., Expo., Conf., Proc. p. 380–385, (1993) RadTech Japan, Tokyo, Japan (No month avail.).

Hayashi et al, *Radiation–Induced Polymerization of Methyl Methacrylates at High Dose Rate*, Journal of Applied Polymer Science, vol. 36, 295–308 (1998) (No month avail.).

*Primary Examiner*—Bernard Pianalto
*Attorney, Agent, or Firm*—Melanie Gover

[57] ABSTRACT

A one-step process using electron beam radiation to polymerize pressure sensitive adhesives on web from acrylate emulsions is disclosed. The radiation may be supplied in a single or multiple dose. Products using such pressure sensitive adhesives are also disclosed.

26 Claims, 2 Drawing Sheets

METHOD OF MAKING ELECTRON BEAM POLYMERIZED EMULSION-BASED ACRYLATE PRESSURE SENSITIVE ADHESIVES

FIELD OF INVENTION

This invention relates to the polymerization of emulsions, using electron beam radiation, to form PSAs.

BACKGROUND OF INVENTION

The advantage of acrylic polymers as viscoelatic bases for pressure-sensitive adhesives are well known in the art. U.S. Pat. No. RE 24,906 (Ulrich) cites many examples of these products. Pressure-sensitive adhesives have been used for more than half a century for a variety of marking, holding, protecting, sealing, and masking purposes. The term "pressure-sensitive adhesive" (PSA) has a precise technical definition and has been discussed extensively in the technical literature, examples of which are Houwink and Salomon, *Adhesion and Adhesives,* Volume 2, Chapter 17, Elsivier Publishing Company, 1967, and *Handbook of Pressure-Sensitive Technology* (2nd Edition), Edited by Donatas Satas, Van Nostrand Reinhold Company, 1989.

Fundamentally, PSAs require a delicate balance of viscous and elastic properties which result in a 4-fold balance of adhesion, cohesion, stretchiness, and elasticity. In essence, PSA products have sufficient cohesiveness and elasticity so that, despite their tackiness, they can be handled with the fingers and removed from smooth surfaces without leaving residue.

There are several methods presently in use for the preparation of PSAs. These methods include batch, hot melt, solution, emulsion, suspension, ultra-violet (UV)-initiated bulk, and UV-initiated on-web polymerization techniques.

Acrylic polymer compositions may be made via solution polymerization. These solution polymerization methods require large amounts of organic solvents. Polymers in solvent may be difficult to handle and transport due to the volume of the solvent and the potential release of volatile organic compounds (VOCs) into the atmosphere. Using solvents also necessitates high heat or vacuum to remove the solvent from the polymers.

Methods of emulsion batch polymerization for pressure-sensitive adhesives have been disclosed in the art. Emulsions generally consist of thermodynamically unstable mixtures of two immiscible liquids. One liquid forms a dispersed phase of droplets in the other liquid. Emulsions may be oil-in-water (continuous water phase) or water-in-oil (continuous oil phase). In water-continuous polymerizable emulsions, the polymerizable materials and additives form small droplets (less than 1 micrometer in diameter) in a water medium.

Surfactants or emulsifiers are added to stabilize the emulsion. These stabilizing materials have a hydrophilic (water-attracting) portion, and a hydrophobic (water-repelling) portion. The stabilizing molecules form colloidal clusters called micelles. The hydrophobic portions of the molecules are drawn to the inside of the micelles, away from the water. The interiors of the micelles are the main polymerization sites for the hydrophobic oil-phase materials. The droplets of oil-phase materials are the source of monomers for the polymerization in the micelles. Any polymerization taking place in the oil droplets is referred to as suspension polymerization.

The emulsion polymerization process is started by water-soluble chemical free radical initiators, which are added to the emulsion and are activated by heat or UV radiation. An oil-soluble chemical free radical initiator may initiate suspension polymerization.

The polymerization reactions can be highly exothermic. To avoid an explosive heat generation and to achieve high molecular weight polymers, the rate of polymerization must be controlled. Polymerization takes place over several hours while the emulsion is agitated. The resulting polymerized materials may be used to form films and coatings, with the addition of a thickener or solvent.

Electron beams operate by bombarding molecules with electrons. These electrons displace other electrons in the bombarded molecules, thereby creating free radicals, which may react with other molecules. Electron-beam radiation produces a high rate of free-radical initiation and may produce free radicals in all components of the system including the product itself. Wilson, *Radiation Chemistry of Monomers, Polymers, and Plastics,* chapter 11, p. 375, New York, 1974. Because of this indiscriminate production of free radicals, electron-beam radiation is generally not used for polymerization processes, but instead is restricted to crosslinking processes.

SUMMARY OF INVENTION

The art has not recognized the ability to produce, nor the advantages of producing, a PSA coated article via electron beam (e-beam) polymerization of emulsion-coated substrates. Nor has the art recognized the advantages of the articles produced by this method.

One aspect of the invention is a method for making an acrylic PSA article comprising:

1) providing a substrate;
2) coating an emulsion-based PSA precursor on the substrate, said precursor comprising (1) one or more acrylate monomers, (2) one or more free-radically copolymerizable monomers, oligomers, or macromonomers, and (3) one or more surfactant or polymeric suspending agents; and
3) irradiating the coated substrate with accelerated electrons to polymerize and crosslink the precursor, thereby forming a PSA coated article.

Another aspect of the invention further comprises grafting the polymerizing emulsion to the substrate during the irradiation of the coated substrate with accelerated electrons.

Yet another aspect of the invention further comprises drying the emulsion-coated substrate during irradiation of the coated substrate with accelerated electrons. The coated substrate may also be dried in a separate step after being irradiated with the accelerated electrons.

A further aspect of the invention is the method of the invention wherein the precursor emulsion has an polymerizable content of 50–90%.

The invention also provides PSA articles.

One aspect of the invention is an adhesive article that is solvent resistant. Another aspect is a PSA article comprising a backing of low surface energy material. Another aspect is a PSA article free of chemical free radical initiators.

As used in this application:

"acrylate monomer" means an acrylate or methacrylate monomer having only one free-radically polymerizable ethylenically-unsaturated group;

"chemical free radical initiator" or "chemical initiator" means a free radical initiator, other than water, that may be added to a PSA precursor to cause polymerization;

"crosslinker" means a copolymerizable monomer, oligomer, or macromonomer with more than one ethylenically unsaturated functional group;

"weight % polymer" means the weight percent of a dried PSA sample based on the total weight of the undried PSA sample, as further described herein;

"emulsion-based PSA precursor" or "precursor emulsion" or "precursor" means an emulsion solution or mixture comprising 1) one or more acrylate monomers, 2) one or more free-radically copolymerizable monomers, oligomers, or macromonomers, and 3) one or more surfactants or polymeric suspending agents, which emulsion, when polymerized (and crosslinked) by application of accelerated electrons, becomes a PSA;

"ethylenically-unsaturated" means an organic compound containing at least one carbon-to-carbon double bond;

"free-radically copolymerizable material" means a free-radically copolymerizable monomer, oligomer, or macromonomer having only one ethylenically unsaturated group;

"graft" means to form a covalent interlayer bond;

"initiator" means a material that promotes the production of free radicals on activation by heat or radiation;

"polymerizable content" or "polymerizable percent" means the weight percent of all oil-phase components based on the total weight of the precursor emulsion;

"solvent resistant" means that exposure to solvents, including water, does not significantly change the color or physical properties of the PSA;

"reactive materials" means the combination of acrylate monomer(s) and free-radically copolymerizable material(s) used in the precursor emulsion formulation (s)[this definition is not intended to imply that all the other precursor emulsion components are necessarily non-reactive];

"wt %" means weight percent.

Advantageous features of the articles of this invention include the optional elimination of chemical free radical initiator residue, solvent resistance, absence of adhesion-promoting agent or primer at the interface of the adhesive and substrate, high adhesion between the adhesive layer and substrate.

The method of the invention has a number of advantages. It provides for economic and efficient manufacturing of PSA articles using emulsion-based PSAs. Upon exposure to accelerated electrons, the water in the emulsion produces a high yield of free radicals which allows for high efficiency of initiation, i.e., six free radicals are produced per 100 eV of energy absorbed. The accelerated electrons also produce free radicals in the oil droplets of the emulsion. These sources of free radicals eliminate the need for chemical free radical initiators; accordingly, there need be no initiator residue in the PSA articles produced. Additionally, because no free radical initiators are required, cationic emulsifiers may be employed without interfering with the free radical initiation system.

An additional advantage is the absence of corrosive or volatile organic solvents in the process. Because no solvent, other than water, is necessary, the issues of solvent evaporation, solvent waste, and high energy consumption inherent in solvent-based systems can be avoided.

Another advantage is that the rate of free radical initiation is constant. This may allow for high weight % polymer (up to 99%). The constant rate of initiation may be achieved because the water acts as a continuous source of initiators. In other emulsion polymerization processes, chemical initiators must be added.

An additional advantage is that the free radical initiation method used in the invention is temperature independent. This permits polymerization at any desired temperature, with the proviso that the water phase must not be frozen or boiling and the components of the emulsion must remain emulsified. In contrast, conventional batch polymerization methods may require the addition of heat if thermally-activated free radical initiators are used. Additionally, batch polymerization methods may be highly exothermic. Excessive heat may cause polymerization reactions to terminate prematurely, thus potentially producing low molecular weight polymers and coagulation of the emulsion polymer.

Polymerizing the emulsion on-web, as is done in the present invention, avoids emulsion particle agglomeration and coagulation. These may occur in an unstable emulsion. To ensure emulsion stability in a batch polymerization, the processing conditions typically need to be carefully controlled over the many hours required for the process, e.g., agitation, buffer addition, controlled exothermic heat. Emulsion instability is avoided or made negligible in the method of the instant invention because coating the emulsion in a thin layer before polymerization allows the heat generated from the polymerization reaction to escape into the atmosphere, which reduces the likelihood of coagulation. Additionally, there is insufficient time between coating, polymerization, and crosslinking for the emulsion components to coagulate. Because these factors reduce or eliminate the tendency of emulsion components of the present invention to coagulate, the selection of additive materials need not be limited by their propensity to coagulate. Therefore, a wider selection of additives is available.

A further advantage of the method of this invention is that fewer steps are required to make a PSA article as compared to other emulsion-based polymerization methods. The process of the invention requires only a single step of coating, polymerizing/crosslinking, grafting, and optionally drying. Batch polymerization, on the other hand, typically involves a polymerization step followed by a subsequent thickening, coating and curing step. The simplified procedure of this invention allows for low energy consumption and elimination of multiple processing steps.

A further advantage is gained due to the high polymerizable content of the emulsion in the present invention. Generally, when the polymerizable content is in the range of 65 to 90%, no thickener is required. Additionally, a high polymerizable content reduces or eliminates water that must be removed from the finished product.

Further features and advantages are disclosed in the following embodiments.

SHORT DESCRIPTION OF FIGURES

EMBODIMENTS OF INVENTION

Figure 1:
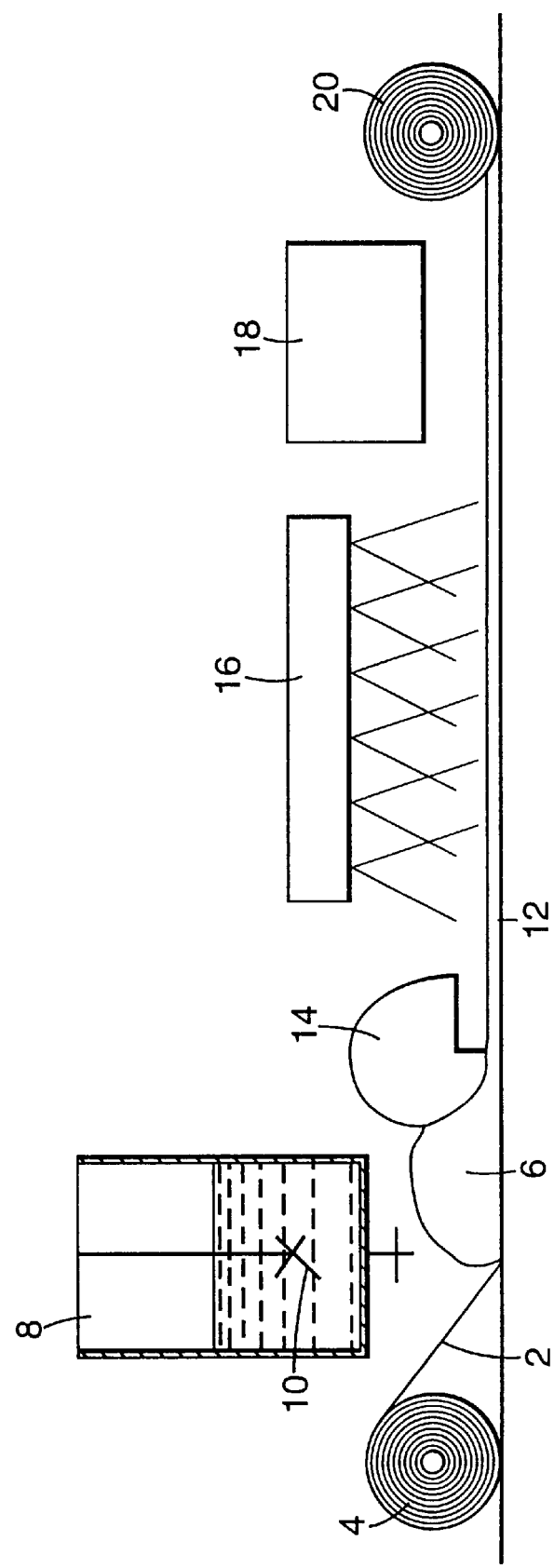
FIG. 1 illustrates a continuous coating process of the invention using multiple e-beam sources.

The product of the present invention begins with a continuous water phase emulsion-based PSA precursor comprised of (1) one or more acrylate monomers, (2) one or more free-radically copolymerizable materials, and (3) one or more stabilizers. The precursor may further comprise other additives such as chemical initiators, crosslinking agents, chain transfer agents, thickening agents, tackifying agents, and polymeric additives as well as plasticizers, dyes, antioxidants, UV stabilizers, and the like.

The precursor emulsion should be coatable at polymerization conditions (e.g., temperatures typically between about 5° C. and ambient, and ambient pressure) to enhance the stability of the precursor emulsion after it is coated on a substrate but before it is polymerized.

After the precursor emulsion is prepared, it is coated on a substrate by conventional coating techniques such as knife coating, spray coating, extrusion coating, die coating, and the like. It may be coated on a continuously moving sheet or roll of substrate, i.e., on-web, or on individual, separate substrates.

The coated substrate is exposed to accelerated electrons, which cause components of the precursor emulsion to polymerize and crosslink to form a PSA.

The accelerated electrons may also cause the polymerizing emulsion to graft to the substrate. The accelerated electrons may further cause the polymerized emulsion to partially or fully dry. If the polymerizing emulsion is not substantially dry, it will not graft sufficiently to satisfactorily adhere to the substrate. The inventors observed that a significant amount of grafting occurred when the precursor emulsion comprised at least 70% polymerizable and 85% cured non-volatile.

Acrylate Monomers

Free-radically polymerizable acrylate monomers are employed in the precursor emulsions of the present invention. Examples include acrylic acid and its esters ("acrylate monomers") and methacrylic acid and its esters ("methacrylate monomers"). These monomers are monofunctional, i.e., have only one free-radically polymerizable group. These monomers, when homopolymerized, have a glass transition temperature of less than about 0° C.

Acrylate and methacrylate monomers useful in the precursor emulsions mixtures of the present invention include one or more acrylate and methacrylate esters of non-tertiary alkyl alcohols, the alkyl groups of which have from about 3 to about 13 carbon atoms. Examples of such monofunctional acrylate and methacrylate monomers include but are not limited to those selected from the group consisting of isooctyl acrylate, 4-methyl-2-pentyl acrylate, 2-methylbutyl acrylate, isoamyl acrylate, sec-butyl acrylate, n-butyl acrylate, tert-butyl acrylate, isobornyl acrylate, butyl methacrylate, dodecyl acrylate, tridecyl acrylate, cyclohexyl acrylate, ethoxylated nonyl phenyl (meth)acrylate, and mixtures thereof.

Preferred acrylate monomers include those selected from the group consisting of isooctyl acrylate, 2-ethylhexyl acrylate, n-butyl acrylate, dodecyl acrylate, tridecyl acrylate, ethoxylated nonyl phenyl (meth)acrylate and mixtures thereof.

Free-radically Copolymerizable Materials

The free-radically copolymerizable materials useful in the precursor emulsions of the present invention include monomers, oligomers, and macromonomers having only one functional group which readily copolymerize with the acrylate monomers described above.

Suitable copolymerizable acrylate functional monomers include but are not limited to acrylic acid, methacrylic acid, itaconic acid, crotonic acid, maleic acid, fumaric acid, sulfoethyl methacrylate, N-vinyl pyrrolidone, N-vinyl caprolactam, acrylamide, t-butyl acrylamide, N,N-dimethyl amino ethyl acrylamide, N-octyl acrylamide, N,N-dimethylacrylamide, hydroxyethyl acrylate, hydroxyethyl methacrylate, acrylonitrile, methyl acrylate, methyl methacrylate, ethyl acrylate, octadecyl acrylate, mixtures thereof, and the like. Preferred monomers include acrylic acid, N-vinyl pyrrolidone, methyl methacrylate, hydroxyethyl acrylate, acrylamide, and mixtures thereof.

In addition, vinyl ester monomers suitable for use as a copolymerizable material in the precursor emulsion mixtures of the present invention (to enhance cohesive strength) include unsaturated vinyl esters of linear or branched carboxylic acids comprising 1 to 12 carbon atoms. Such vinyl ester monomers include but are not limited to vinyl 2-ethylhexanoate, vinyl caprate, vinyl laurate, vinyl pelargonate, vinyl hexanoate, vinyl propionate, vinyl decanoate, and vinyl octanoate. Preferred vinyl ester monomers include vinyl acetate, vinyl laurate, vinyl caprate, vinyl-2-ethylhexanoate, and mixtures thereof.

Free-radically copolymerizable oligomers and macromonomers that will copolymerize with the acrylate monomers, either alone or in combination with the free-radically copolymerizable monomers, include acrylate-terminated poly(methyl methacrylate), methacrylate-terminated poly(methyl methacrylate), p-vinyl benzyl-terminated poly(methyl methacrylate), acrylate-terminated poly(styrene), methacrylate terminated poly(styrene), acrylate-terminated poly(ethylene oxide), methacrylate-terminated poly(ethylene oxide), acrylate-terminated poly(ethylene glycol), methacrylate-terminated poly(ethylene glycol), methoxy poly(ethylene glycol) methacrylate, butoxy poly(ethylene glycol) methacrylate, p-vinyl benzyl-terminated poly(ethylene oxide), p-vinyl benzyl-terminated (ethylene glycol), and mixtures thereof. These materials are preferred because they are easily prepared using well-known ionic polymerization techniques and are also highly effective in providing grafted oligomeric and polymeric branches along free-radically polymerized acrylate polymer backbones.

One class of useful copolymerizable oligomers and macromonomers are those comprising a polymeric moiety having a glass transition temperature, $T_g$, greater than 20° C. as described in U.S. Pat. No. 4,554,324 (Husman et al.), incorporated herein by reference. Such copolymerizable oligomers and macromonomers include, for example, ethylmethacrylate-terminated polystyrene (having a molecular weight of approximately 13,000) available under the trade name CHEMLINK 4500 from Sartomer Co., West Chester, Pa. Other useful polymerizable oligomers, and macromonomers include acrylate-terminated poly(ethylene) glycols, such as acrylate-terminated poly(ethylene oxide) (having a molecular weight of 550), available under the trade name AM-90G from Shin-Nakmura Inc., Japan.

Component Ranges

The precursor emulsions of this invention and the pressure-sensitive adhesives made therefrom comprise, based upon 100 parts by weight of reactive materials, about 50 to about 99 parts by weight of one or more acrylate monomer(s) and 1 to about 50 parts by weight of one or more free-radically copolymerizable material(s).

Preferably, the precursor emulsion comprises about 70 to about 96 parts of at least one acrylate monomer and about 4 to about 30 parts of at least one free-radically copolymerizable material. Most preferably the precursor emulsion comprises about 80 to about 96 parts of at least one acrylate monomer and about 4 to about 20 parts of at least one free-radically copolymerizable material.

Stabilizers

Polymerization via emulsion techniques requires the presence of a stabilizer such as a surfactant (also referred to an "emulsifying agent" or a "emulsifier") or a polymeric suspending agent. These types of materials allow for the formation and stabilization of the precursor emulsion solution. Without a stabilizer, the oil phase and water phase may separate.

Surfactants

Useful surfactants for the present invention include nonionic surfactants, anionic surfactants, copolymerizable surfactants, cationic surfactants, and mixtures thereof.

Useful nonionic surfactants include but are not limited to those with molecular structures comprising a condensation product of an organic aliphatic or alkyl aromatic hydrophobic moiety and a hydrophilic alkylene oxide, such as ethylene oxide. The Hydrophilic-Lipophilic Balance (HLB) of useful nonionic surfactants is about 10 or greater, preferably from about 15 to about 20. The HLB of a surfactant is an expression of the balance of the size and strength of the hydrophilic (water-loving or polar) groups and the lipophilic (oil-loving or non-polar) groups of the surfactant. Commercial examples of nonionic surfactants useful in the present invention include but are not limited to nonylphenoxy or octylphenoxy poly(ethyleneoxy) ethanols available as the IGEPAL CA or CO series, respectively from Rhone-Poulenc, Inc., Cranberry, N.J.; C11–C15 secondary-alcohol ethoxylates available as the TERGITOL 15-S series, including 15-S-7, 15-S-9, 15-S-12, from Union Carbide Chemicals and Plastics Co., Gary, Ind.; polyoxyethylene sorbitan fatty acid esters available as the TWEEN series of surfactants from ICI Chemicals, Wilmington, Del.; polyethylene oxide (25) oleyl ether available under the trade name SIPONIC Y-500-70 from Americal Alcolac Chemical Co., Baltimore, Md.; alkylaryl polyether alcohols available as the TRITON X series, including X-100, X-165, X-305, and X-405, from Union Carbide Chemicals and Plastics Co., Gary, Ind.

Useful anionic surfactants include, but are not limited to, those with molecular structures comprising (1) at least one hydrophobic moiety, such as from about $C_6$- to about $C_{12}$-alkyl, alkylaryl, and/or alkenyl groups, (2) at least one anionic group, such as sulfate, sulfonate, phosphate, polyoxyethylene sulfate, polyoxyethylene sulfonate, polyoxyethylene phosphate, and the like, and/or (3) the salts of such anionic groups, wherein said salts include alkali metal salts, ammonium salts, tertiary amino salts, and the like. Representative commercial examples of useful anionic surfactants include sodium lauryl sulfate, available under the trade name TEXAPON L-100 from Henkel Inc., Wilmington, Del., or under the trade name POLYSTEP B-3 from Stepan Chemical Co, Northfield, Ill.; sodium lauryl ether sulfate, available under the trade name POLYSTEP B-12 from Stepan Chemical Co., Northfield, Ill.; ammonium lauryl sulfate, available under the trade name STANDAPOL A from Henkel Inc., Wilmington, Del.; and sodium dodecyl benzene sulfonate, available under the trade name SIPONATE DS-10 from Rhone-Poulenc, Inc., Cranberry, N.J.

Other suitable anionic surfactants include but are not limited to ethylenically-unsaturated copolymerizable surfactants of the formula: R—O—(R'O)$_m$—(CH$_2$CH$_2$O)$_{m-1}$13 CH$_2$CH$_2$ X, where R is selected from the group consisting of $C_{12}$–$C_{18}$ alkenyl, acrylyl, acrylyl ($C_1$ to $C_{10}$) alkyl, methacrylyl, methacrylyl ($C_1$ to $C_{10}$) alkyl, vinylphenyl and vinylphenylene ($C_1$ to $C_6$); R'O is selected from the group consisting of bivalent alkyleneoxy groups derived from epoxy compounds having more than two carbon atoms, preferably three or four carbon atoms, such as propylene oxide, butylene oxide, etc. and combinations thereof; m represents an integer of about 5 to about 100; n represents an integer of about 5 to about 100; the ratio of m to n being from about 20:1 to about 1:20. Varying the ratio of m to n will vary the HLB of the polymerizable surfactant. The HLB for anionic copolymerizable surfactants useful in the present invention, exclusive of the X-group, is from about 8 to about 18. X is an anionic group such as sulfonate, sulfate, phosphate, and alkali metal salts or ammonium salts or tertiary amino salts of such anionic groups. An example of such a copolymerizable anionic surfactant is alkylene polyalkoxy sulfate available under the trade name MAZON SAM 211 from PPG Industries, Inc., Gurnee, Ill., o-propylene-p-alkyl phenolethoxy ammonium sulfate available under the trade name HS-10 from DKS, International, Inc., Japan.

Cationic surfactants useful in the present invention include but are not limited to quaternary ammonium salts in which at least one higher molecular weight substituent and two or three lower molecular weight substituents linked to a common nitrogen atom to produce a cation, and wherein the electrically-balancing anion is a halide (bromide, chloride, etc.), acetate, nitrite, and lower alkosulfate (methosulfate etc.). The higher molecular weight substituent(s) on the nitrogen may be higher alkyl group(s), containing about 10 to about 20 carbon atoms. The lower molecular weight substituents may be lower alkyl of about 1 to about 4 carbon atoms, such as methyl or ethyl, which may be substituted, as with hydroxy, in some instances. One or more of the substituents may include an aryl moiety or may be replaced by an aryl, such as benzyl or phenyl. Also among the possible lower molecular weight substituents are lower alkyls of about 1 to about 4 carbon atoms, such as methyl and ethyl, substituted by lower polyalkoxy moieties such as polyoxyethylene moieties, bearing a hydroxyl end group, and falling within the general formula —R(CH$_2$CH$_2$O)$_{n-1}$—CH$_2$CH$_2$OH where —R is a $C_{1-4}$ divalent alkyl group bonded to the nitrogen, and n represents an integer of about 1 to about 15. Alternatively, one or two of such lower polyalkoxy moieties having terminal hydroxyls may be directly bonded to the quaternary nitrogen instead of being bonded to it through the previously mentioned lower alkyl. Examples of useful quaternary ammonium halide surfactants for use in the present invention include but are not limited to trimethyl alkyl $C_{12}$–$C_{16}$ benzyl ammonium chloride, available under the trade name VARIQUAT 50MC from Witco Corp., Greenwich, Conn.; methylbis(2-hydroxyethyl)co-ammonium chloride or oleyl-ammonium chloride, available under the trade names ETHOQUAD C/12 and ETHOQUAD O/12, respectively, from Akzo Chemical Inc., Matawan, N.J.; and methyl polyoxyethylene (15) octadecyl ammonium chloride, available under the trade name ETHOQUAD 18/25 from Akzo Chemical Inc., Matawan, N.J.

A useful range of surfactant concentration is from about 0.1 to about 8 parts, preferably from about 0.5 to about 5 parts, based upon 100 parts by weight of the reactive materials.

Polymeric Suspending Agents

Polymeric suspending agents may also be used in the precursor emulsions, either alone or in combination with surfactants, to stabilize the precursor emulsions. Suitable polymeric suspending agents are those conventionally used in emulsion polymerization processes and include, for example, water-soluble organic suspending agents such as polyacrylic acid and polyvinyl alcohol. The suspending agent may be present in amounts ranging from about 0.01 part to about 5 parts based on 100 parts by weight of the reactive materials.

Multifunctional Crosslinking Agents

Multifunctional crosslinking agents may be added to the precursor emulsion formulation to control the cohesive strength and other properties of the final polymer. The crosslinking agents are copolymerizable. Examples of copolymerizable crosslinking agents include but are not limited to alkyl diacrylates such as 1,2-ethylene glycol diacrylate, 1,4-butanediol diacrylate, 1,6-hexanediol diacrylate, 1,8-octanediol diacrylate; and 1,12-dodecanediol diacrylate, alkyl triacrylates and tetracrylates such as trimethylol propane triacrylate and pentaerythritol tetraacrylate, and mixtures thereof. A preferred copolymerizable crosslinking agent is trimethylol propane triacrylate.

Other useful multifunctional crosslinking agents include those selected from the group consisting of oligomeric and polymeric multifunctional acrylates and methacrylates, e.g., poly(ethylene oxide) diacrylate or poly(ethylene oxide) dimethylacrylate, and difunctional urethane acrylates, such as EBECRYL 270 and EBECRYL 230 (1500 weight average molecular weight and 5000 weight average molecular weight acrylated urethanes, respectively) both available from Radcure Specialties, Atlanta, Ga., and mixtures thereof.

Crosslinking agents, when used, preferably comprise at least 0.5 parts by weight of the precursor emulsion, based on 100 parts by weight of the reactive materials.

Chain Transfer Agents

The precursor emulsion may further comprise a chain transfer agent. Chain transfer agents are added to control the molecular weight of the resulting PSA. They act to terminate the polymerization process for a forming polymer, causing the polymer to have a shorter chain length, and thus a lower molecular weight, than it might otherwise have. In general, the more chain transfer agent added, the lower the molecular weights of the resulting polymers. Examples of useful chain transfer agents include but are not limited to those selected from the group consisting of carbon tetrabromide, alcohols, mercaptans, and mixtures thereof. When present, preferred chain transfer agents are n-dodecyl mercaptan, isooctylthioglycolate, pentaerythritol tetrathioglycolate and carbon tetrabromide. The precursor emulsion may comprise up to about 0.5 parts by weight of a chain transfer agent, typically about 0.01 parts to about 0.5 parts, more preferably about 0.05 parts to about 0.2 parts, based upon 100 parts by weight of the reactive materials.

Thickeners

Additives may be added to an emulsion to control the shear or cohesive strength and other properties of the resulting PSA. Adding a polymer or copolymer, a polysaccharide thickener, and/or an inorganic thickening agent to the precursor emulsion may alter the viscosity of the emulsion. For example, increasing the viscosity of the precursor emulsion may make it easier to coat onto a substrate.

A polysaccharide thickener or inorganic thickening agent may be used to modify the precursor's coating viscosity and/or if thicker pressure-sensitive adhesive layers are desired. Examples of useful polysaccharide thickener are starches such as corn starch. Suitable inorganic thickening agents include silicas such as hydrophilic silica available under the trade name CAB—O—SIL M5 from Cabot Corporation, Tuscola, Ill. and colloidal silicas available under the trade names NALCO 2327 or NALCO 1034A from Nalco Chemical Co., Naperville, Ill. When used, the polysaccharide thickener or inorganic thickening agent may comprise about 1 to about 10 parts by weight, preferably about 1 to about 3 parts by weight of the precursor emulsion based on 100 parts by weight of the reactive materials.

Thickening of the precursor emulsion may also be attained by adding a prepolymerized acrylate syrup. Such syrups may be formed by partially polymerizing acrylate monomers and free-radically copolymerizable monomers. Using this method, the monomers, combined with chemical free radical initiators, which may be thermal initiator or photoinitiators, are polymerized by exposure to heat, ultraviolet light or other radiation sources, until a small degree of polymerization (e.g., 5–10%) has taken place, thus forming a thickened acrylate syrup. Processes for preparing acrylate syrups are described, for example, in U.S. Pat. No. 5,028,484 (photoinitiator) and U.S. Pat. No. 4,749,590 (thermal initiator). When used, the acrylate syrup may comprise about 1 to about 50 parts by weight, preferably about 1 to about 10 parts by weight of the precursor emulsion based on 100 parts by weight of the reactive materials.

An alternative method is to partially copolymerize the reactive materials prior to mixing with other components and prior to emulsification.

Tackifying Agents

Tackifying agents may be added to the precursor emulsion to alter peel and shear properties of the resulting PSA article. Useful tackifying agents include hydrogenated hydrocarbon resins, phenol modified terpenes, poly(t-butyl styrene), synthetic hydrocarbon resins, rosin esters, vinyl cyclohexane, and the like. Examples of such tackifying agents include synthetic and natural resins available under the trade names REGALREZ 1085, REGALREZ 1094, REGALREZ 6108, PICCOLYTE S-1 15, and FORAL 85, all from Hercules Chemical Co., Wilmington, Del.; under the trade name WINGTACK PLUS, from Goodyear Tire and Rubber Company, Akron, Ohio; under the trade name ESCOREZ 1310, from Exxon Chemical Co., Houston, Tex.; and under the trade name ARKON P-90, from Arakawa Chemical Industries, Osaka, Japan.

Initiators

One of the major advantages of the present invention is that no chemical free radical initiators are required to initiate the polymerization process. Subjecting the water phase of the precursor emulsion to e-beam radiation generates hydrogen and hydroxy free radicals (on the order of 6 radicals per 100 eV of absorbed energy). These free radicals are highly reactive and allow efficient free radical initiation without the need of chemical initiators. Additionally, electron-beam irradiation causes monomer decomposition in the oil droplets, which also generates free radicals. However, chemical initiators may be used, if desired, to increase the rate of conversion of monomers to polymers. Adding initiators, specifically photoinitiators, may change the properties of the resulting PSA, for example, may increase shear strength and decrease peel adhesion or vice versa.

Photoinitiators may be activated by electron beam radiation and may be used with the e-beam process. Suitable photoinitiators may be organic, organometallic, or inorganic compounds, but are most commonly organic in nature. Examples of commonly used organic photoinitiators include benzoin and its derivatives, benzyl ketals, acetophenone, acetophenone derivatives, anthraquinones, anthraquinone derivatives, triazine derivatives and benzophenone, and benzophenone derivatives.

The chosen initiator or mixture of initiators, if used, are generally emulsified with the emulsion-based pressure-sensitive adhesive precursor. Typically, the initiator or initiator mixture, if present, will constitute less than about 2 parts, preferably less than about 1 part, and most preferably less than about 0.5 part by weight of the precursor based on 100 parts by weight of the reactive materials.

Other Additives

Other additives may be used to alter properties such as the glass transition temperature of the pressure sensitive adhesive. Useful polymers include acrylic polymers such as poly(methylmethacrylate) available under the trade name ELVACITE 1010, 2010 from ICI Americas, Wilmington, Del. The polymer(s) or copolymer(s) typically comprise 1 to 5 parts per 100 parts of the reactive materials.

The precursor emulsion of the invention may also contain one or more conventional additives including plasticizers, dyes, fillers, antioxidants, and UV stabilizers. Such additives may be used if they do not detrimentally affect the properties or performance of the resulting PSAs.

Substrates

The precursor emulsions of the present invention are easily coated onto substrates, i.e., backing materials, by conventional coating techniques prior to electron beam irradiation. A wide variety of substrates may be used, so long as the substrate is not significantly degraded by exposure to accelerated electrons. The substrates may be any materials conventionally used as a tape backing, optical film, or any other flexible material. Typical examples of substrates that may be useful for this invention include those made of paper or wood, plastic films such as polyethylene, polypropylene, polyurethane, polyvinyl chloride, polyester (e.g., polyethylene terephthalate), polystyrene, polycarbonates, polyphenylene oxides, polyimides, polyvinyl fluoride, polyvinylidene fluoride and polytetrafluoroethylene, cellulose acetate, and ethyl cellulose.

Substrates may also be made of fabric such as woven fabric formed from threads of synthetic or natural materials such as cotton, nylon, rayon, glass, ceramic materials, and the like, or nonwoven fabric such as air-laid webs of natural or synthetic fibers, or blends of these. Materials normally used as release liners may also be used. These include silicone-coated polymer film or paper and polyethylene-coated paper. The substrates may also be formed of metal such as aluminum foil, copper foil, tin foil, and steel panels, metalized polymer films, metalized plastics, or ceramic sheet materials. The substrates may be flexible or rigid, and may be occlusive or non-occlusive. The substrates may take the form of any article conventionally known to be used with PSA compositions such as labels, tapes, signs, covers, marking indicia, and the like.

Substrates that particularly take advantage of the process of the invention are those that normally require adhesion-promoting or priming treatments to adhere to pressure-sensitive adhesives. Such substrates include unprimed polyethylene terephthalate (PET) and materials with low surface energies, i.e., typically less than 30 ergs/cm$^2$, or surface energies lower than that of the precursor emulsion. For use in this invention, these backings do not require any pre-treatment. Exposure of these substrates to accelerated electrons creates reactive sites in the substrate. This allows for chemical bonding at the interface of the polymerizing/ crosslinking precursor emulsion and the substrate on which it is coated. Suitable substrates also include those that are not easily wet by water such as, for example, polyethylene, polypropylene and polyethylene terephthalate, and substrates used as release liners such as, for example, silicone-coated paper, silicone-coated polymer film and polyethylene-coated paper.

Process Parameters

FIG. 1 is an illustration of a method of the invention. The substrate 2 is fed from an unwind station 4. The precursor emulsion 6 is delivered from a container 8 (with an optional stirrer 10) onto the moving substrate and is formed into a coating 12 on the substrate by a coater 14, such as a knife bar coater. The coated substrate passes through an electron beam source 16 (a multiple e-beam source is represented), under an optional dryer 18, and is collected at a windup station 20.

Preparation of precursor emulsion

Before preparing the precursor emulsion mixture, a premix of the reactive materials and any other desired additives is prepared. An oil-in-water emulsion is separately prepared by mixing deionized water with a surfactant in a homogenizing mixer. Suitable mixers include a Greerco homogenizer available as model #12 from Greerco Corp., Hudson, NH or an OMNI homogenizer available as model #17105 from OMNI Corp. International, Waterbury, Conn. The surfactant and water mixture is initially agitated at a medium speed setting to dissolve the surfactant in the deionized water, then at a high speed setting to form a thick foam. Once the mixture is formed and foamed, the premix is added to the emulsion slowly. It may be added in small increments (e.g., each increment comprising about $\frac{1}{10}^{th}$ to $\frac{1}{5}^{th}$ of the premix), making sure that each increment is emulsified before the next increment is added. If the premix is added all at once, the mixture may not become thickened. This combined mixture is mixed under high shear conditions until the premix materials form droplets less than 1 micrometer in diameter and are homogeneous when viewed under an optical microscope. The homogeneous oil-in-water emulsion will preferably have a paste-like appearance. This consistency will allow the emulsion to easily wet the substrate and will provide stability of the emulsion prior to polymerization.

The polymerizable content of the precursor emulsion may range from 50 to 90%, preferably 65–80%. Advantageously, a high polymerizable content reduces or eliminates the need for a thickener. It also improves contact between the precursor emulsion and the substrate surface, thus enabling grafting reactions to occur upon exposure to accelerated electrons. A high solids content may also decrease or eliminate the need to remove water from the product. The reaction process itself may provide adequate conditions to cause any excess water to evaporate. A paste-like or syrup-like consistency indicates a suitable viscosity for coating the precursor emulsion onto a substrate.

The precursor emulsion mixture may be conveniently coated by conventional techniques at viscosities of about 500 to about 10,000 centipoise (cps), preferably 1500 to 8,500 cps (as measured with a Brookfield Viscometer, Spindle No. 3, at 12 revolutions/minute, and 24° C.), depending on the coating method and application. When the precursor emulsion has a solids content below 60%, viscosity of the emulsion may be increased as necessary by incorporating thickeners into the emulsion or partially copolymerizing the reactive materials prior to mixing with other components and prior to emulsification. If this is done, care must be taken to ensure that the thickener is not significantly interfering with polymerization reactions, and that the residence time, dose rate, and/or total dose are adjusted as appropriate to accommodate inclusion of the thickener. However, a precursor emulsion with low solids content may be polymerized without thickeners if the time between coating and polymerization is short enough to prevent the precursor emulsion from flowing off the substrate.

Coating Techniques

Techniques for coating the precursor emulsion on the substrate include any method suitable for solution coating on a substrate such as spray coating, curtain coating, casting, calendaring, knife coating, doctor blade coating, roller coating, reverse roller coating, extrusion coating, and die coating.

Per the method of the invention, the precursor emulsion is coated and polymerized directly on an end-use substrate. The precursor emulsion may be coated onto a substrate and subjected to e-beam radiation to form a film layer of PSA adherently bonded to the substrate. Emulsion thicknesses of about 10 to 500 micrometers may be conveniently polymerized in accordance with this process.

Irradiation of precursor emulsion

Figure 2:
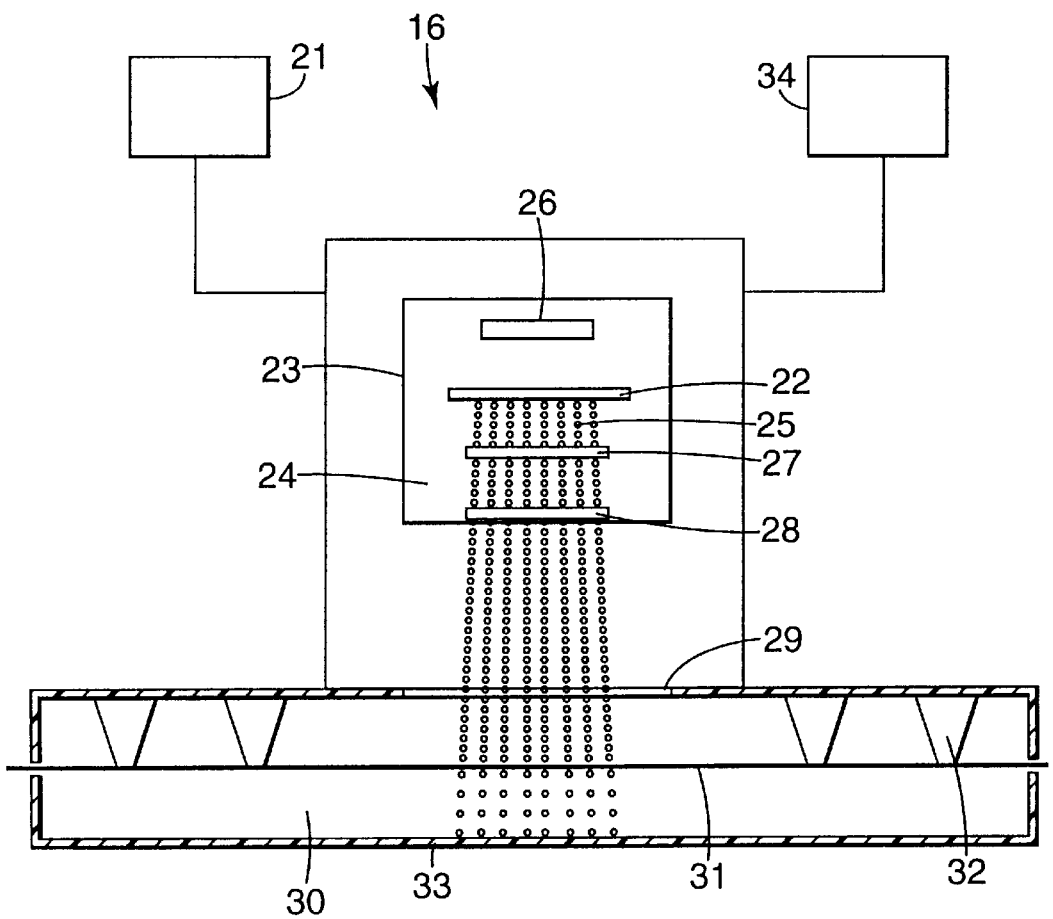
FIG. 2 is a detailed illustration of an electron beam source.

FIG. 2 is a detailed representation of an electron beam source 16 (a single e-beam source is represented). Electron beams (e-beams) are generally produced by applying high voltage from a high voltage power supply 21 to tungsten wire filaments 22 inside an electron gun assembly 23. The gun assembly is in a vacuum chamber 24 maintained at about $10^{-6}$ Torr. The hot filaments produce electrons 25 which are guided by a repeller plate 26 and extractor grid 27, in the form of a beam, i.e., collection of accelerated electrons, toward a terminal grid 28 and subsequently toward a thin window of metal foil 29 through which they exit the chamber into the atmosphere 30, and into whatever material is positioned proximate the window, such as a substrate 31. The atmosphere is kept substantially oxygen-free by the influx of nitrogen from nitrogen nozzles 32. The electrons are accelerated by the beam voltage, i.e., the difference in voltage between the extractor grid and the ground. The electrons travel from the gun assembly toward the window at speeds in excess of $10^7$ m/sec and possess about 150 to 300 keV. They typically travel a distance of 10 to 20 centimeters. The quantity of electrons generated is directly related to the beam current. Beam voltage governs how far the electrons penetrate into a substrate. A voltage of 100 keV is barely sufficient to penetrate a 12 micrometer titanium film window. A voltage of 175 keV is usually sufficient to penetrate 50 micrometers of coating/substrate. A voltage of 220 keV was typically chosen to allow reasonably uniform penetration of about 125 micrometers of coating/substrate. The beam collector 33 collects residual electrons. E-beam processing can be extremely precise when under computer control 34, such that a particular dose and dose rate of electrons may be directed against the coated substrate.

Electron beam generators are commercially available from a variety of sources. E-Beam generators include the ELECTROCURE EB SYSTEM (multiple filament), CB-175 ELECTROCURTAIN, CB-300 ELECTROCURTAIN, and the double cathode gun Model 7700 ELECTROCURTAIN, (all single filament), all of which are available from Energy Sciences, Inc. of Wilmington, Mass., and the BROADBEAM EB PROCESSOR available from RPC Industries of Hayward, Calif.

For any given piece of equipment and irradiation sample location, the dosage delivered can be measured in accordance with ASTM E-1275 entitled "Practice for Use of a Radiochromic Film Dosimetry System."

Dose is the total amount of energy deposited per mass unit. Dose is commonly expressed in Megarads (Mrads) or kilograys (kGy). A Mrad is 10 kilograys. A rad is defined as the amount of radiation required to supply 100 ergs of energy per gram of mass, with a megarad comprising one million rads. A kilogray is defined as the amount of radiation required to supply 1 joule of energy per kilogram of mass.

The total dose received by the precursor emulsion primarily affects the extent to which monomer is converted to polymer and the extent to which the polymers are crosslinked. In general, it is desirable to convert at least 80 wt % of monomer to polymer. Total dosage depends on a number of processing parameters including voltage, beam current, residence time (total time the sample is irradiated), distance from the accelerated electron source, web speed, and number of passes. Dose can be regulated by controlling line speed (i.e., the speed at which the precursor emulsion passes by the e-beam window) and the beam current. A target dose can be conveniently calculated by multiplying an experimentally measured coefficient (a machine constant) by the beam current and dividing by the web speed to determine the dose. The machine constant varies as a function of beam voltage.

To provide the desired dose and residence time, a continuously moving web may be used to transport a substrate coated with the precursor emulsion under the e-beam window at a speed calculated to deposit the desired dose of e-beam energy onto the coated substrate. Using multiple e-beam generators may allow for faster processing while achieving the same residence time as with a single e-beam generator. Per the multiple e-beam method, a continuous web of coated substrate moves past an array of e-beam generators operated and positioned to provide a substantially uniform dose of e-beam energy over the coated substrate surface at a defined line speed.

In general, there will be an optimum dose rate, i.e., combination of residence time and total dose that provides the properties desired in the PSA that is produced. The most practical conditions for a commercial process will be the shortest residence time that will produce the desired PSA properties. Practicable residence times will govern the process speed and/or length of the processor.

Desired dose rates can be achieved by manipulating residence time. This can be done with conventional electron beam generating equipment by using the multiple e-beam method described above and controlling the e-beam emission rates as well as the line speed of the coated substrate through the array. This method will allow increased residence time (i.e., total time the coated substrate is exposed to accelerated electrons) and a decreased dose rate without decreasing the total dose.

The inventors found that by controlling dose rate (dose/total residence time) by manipulating dose and total residence time they could achieve greater than 95% weight % polymer. In determining the optimum dose and residence time, several factors were considered. These included: (1) higher dose rates may cause lower molecular weight polymers, (2) lower dose rates may allow for higher molecular weight, but require longer processing times, (3) higher total dose may allow for higher conversion of monomer to polymer, but may cause excessive cross-linking (which can reduce tack), (4) higher solids content makes it easier to coat and wet a substrate, but may result in excess oil-phase materials (which may affect the polymerization process), and (5) lower solids content will generally produce a precursor emulsion with lower viscosity, which may be difficult to coat and to graft onto a substrate. Many of these factors are illustrated in Table 2.

Using a single e-beam generator, the inventors varied the web speeds and number of passes to control the effect of residence time on monomer to polymer conversion at different dose levels. Residence time is calculated as the length of the area of e-beam illumination in the direction of web movement (centimeters) divided by the web speed (cm/sec). If more than one pass is used, the residence times for all the passes must be summed to determine the total residence time. The length of e-beam illumination for the ELECTROCURTAIN Model CB-175 is about 10 cm, for Model CB-300 is about 14 cm, and for Model 7700 is about 35 cm.

For many of the experiments performed, the inventors used a multi-pass technique on the CB-300 model. Total residence time during irradiation was in the range of about 2 to about 9 seconds. A single pass technique may also be used. Multiple passes were often used to achieve the total dose and residence times desired. A broad range of dose/residence time combinations is useful for electron beam emulsion polymerization. For the experiments performed by the inventors, it was found that preferable residence times were in the range of about 5 to about 9 seconds with total absorbed doses in the range of 120 to 80 kiloGrays, respectively.

The properties of the resulting PSA may depend on a number of variables. For example, weight % polymer under any set of conditions will vary depending upon factors such as the compositions of the emulsion, polymerizable content, and the surfactant used. Weight % polymer is closely related to percent conversion of monomer to polymer. Because water and monomers were lost to the atmosphere during the polymerization process of invention, an accurate conversion percent could not be determined by gravimetric methods. Weight % polymer is also affected by residence time and total dosage, as shown in Table 2. Both longer residence time and/or higher dose levels had the effect of increasing weight % polymer. Longer residence time for a given dose (i.e., lower dose rate) allowed a higher weight % polymer. For example, for a 70% polymerizable emulsion precursor at a total absorbed dose of 8 Mrad, the weight % polymer at 2.2 seconds residence time was 85%, the same dose for 4.5 seconds achieved 93% weight % polymer, and the same dose for 9.0 seconds achieved 99% weight % polymer. A six-pass protocol of 2 Mrads per pass at a web speed of 12.7 centimeters/second (cm/s) provided a residence time of 6.7 seconds and achieved a 98% weight % polymer. An equivalent three-pass protocol of 5/5/2 Mrads per pass at web speeds of 5.1/5.1/12.7 cm/s at 220 keV was adopted as an effective standard processing condition for screening compositions on this equipment (the CB-300).

There appears to be no upper limit for an effective residence time. Additionally, it appears that the total dose required for high weight % polymer decreases as residence time increases. Nevertheless, manufacturing limitations may promote the use of short residence times. At short residence times, the dose required to achieve 98% weight % polymer is high (See Table 2). However, high doses generally result in low molecular weight, excessively-crosslinked polymers. Excessive crosslinking may cause a PSA to have poor shear and peel properties.

Atmosphere

E-beam irradiation of the precursor emulsion is preferably carried out as an open-face (i.e., open to the atmosphere) process so that water can freely evaporate as the emulsion is polymerized. This type of open-face process requires a substantial absence of oxygen, which inhibits free-radical polymerization. Hence, e-beam irradiation of an emulsion should be conducted in an inert atmosphere such as nitrogen, carbon dioxide, helium, argon, etc. The concentration of oxygen can conveniently be measured by an oxygen analyzer and is preferably maintained at a level of less than about 3000 ppm, more preferably less than 100 ppm, especially for oxygen-sensitive materials.

Temperature

The method of this invention is temperature independent, which provides the advantage of not having to control the reaction temperature. Generally, the temperature of the materials during the mixing and coating stages should be between about 5° C. and about 30° C. This is to ensure that the water in the emulsion is maintained in a liquid state (not boiling or frozen), to ensure the coated emulsion maintains a stable viscosity, and to avoid excessive heat, which may cause the emulsion to become unstable. Although the polymerization reactions are exothermic, the method of the present invention avoids the accumulation of heat. Because the emulsion is spread in a thin layer, which is open to the atmosphere, the heat dissipates readily into the atmosphere.

Usefulness of the Invention

The method of the invention allows for a one-step, on-web preparation of PSA articles directly from a precursor emulsion. The method allows for excellent adhesion of the resulting PSA to substrates. This adhesion property can be achieved on untreated low surface energy substrates such as polyethylene terephthalate, silicone release liners, and biaxially oriented polypropylene.

Nonlimiting examples of the uses of the PSAs of the present invention include PSA tapes, sheets, and rolls. A preferred use of the PSAs of the present invention is as a clear, removable, solvent-resistant tape product. The PSA articles of the invention may provide a wide range of desired properties.

This invention is further illustrated by the following examples which are not intended to limit the scope of the invention.

Testing Procedures

The following tests have been used to evaluate polymerized compositions of the invention.

Weight % Polymer

This test was performed on samples after they were subjected to an electron-beam source. To minimized premature evaporation of volatiles (consisting primarily of water and unreacted monomer(s)), the coated side of the substrates were covered with a release liner and the substrates were stored in separate sealed plastic bags until they were tested. Before testing, the release liner was removed by hand. A 3.2 cm square sample was the die-cut from the coated substrate and placed in a preweighed aluminum pan. The sample was weighed before and after being placed in an oven for 2 hours at 100° C. A sample of uncoated substrate was also die-cut and weighed. The weight % polymer was calculated as follows:

$$((m2-m0) \times 100)/(m1-m0)$$

where $m0$ is the weight of the sample of uncoated substrate, $m1$ is the weight of the sample before being drying, and $m2$ is the weight of the sample after drying. Reported values were an average of 2 samples. Estimated error in the measurement was ±1.0%.

This method was used to determine weight % polymer unless otherwise noted.

Gel Percent

The gel percent was determined by one of two methods. In Method A, the polymerized PSA was peeled from the release liner by hand. The PSA was then dried by being placed for 20 minutes in an oven maintained at 65° C. About 0.5 g of the dried adhesive (comprised of several die cut samples) was submerged in about 25 ml of heptane in a sealed glass jar. The jar was shaken for 24 hours by machine at a rate of about 120–180 strokes/minute. The contents of the jar was then filtered through a No. 4 size filter paper (12.5 cm circle), available from Whatman International Ltd, Maidstone, England, to separate any crosslinked polymer, i.e., the insoluble portion. The extracted portion was collected in a preweighed glass jar, air dried, weighed and recorded. The percent extracted and the gel percent were calculated by the following formulas:

$$\% \text{ extractables} = m2 \times 100/m1$$

$$\text{Gel } \% = 100 - \% \text{ extractable}$$

where $m1$ is the weight of the dried adhesive and $m2$ is the weight of the dried extracted portion.

In Method B, a tape sample was die cut into a circle having a diameter of about 2.5 cm (1 in). The release liner was then peeled by hand from the PSA tape. The PSA tape sample was weighed, placed in a preweighed basket that was then submerged in ethyl acetate in a sealed glass jar for 24 hours to extract dissolvable reactants from the polymerized coating. The sample portion remaining in the basket was then dried for 20 minutes in an oven set at 65° C., and weighed. A sample of the uncoated release liner was also die-cut and weighed. The gel percent was calculated by the following formula:

Gel %=(m3−m1−m0)(100)/(m2m1−m0).

where m0 is the weight of the die-cut uncoated film, m1 is the weight of the basket, m2 is the weight of the die-cut tape sample circle, and m3 is the weight of the dried tape sample including the basket.

For both methods, results are an average of two samples and are reported to the nearest whole number. All measurements were made with Method B unless specified otherwise.

Swell

Swell was measured to determine solvent resistance. This measurement was taken during the Gel Percent procedure B. After the preweighed basket containing the insoluble portion of the sample was removed from the solvent, the outside of the basket was quickly dried with an absorbent paper and the basket was immediately placed on a scale and weighed (to avoid any solvent evaporation from the tape sample). Swell was calculated as the difference between the weight of the sample before and after submersion in the solvent. Low swell and no visible change in size/form indicates higher solvent resistance.

Molecular Weight (MW)

The molecular weight of materials extracted by Gel Percent method A was determined by using a Hewlett-Packard 1090-LUSI Gas Phase Chromatograph (GPC), equipped with a UV detector, set at 254 nm, and a refractive index detector (Hewlett Packard, Model 1037A). A column set, commercially designated as a regular column set, available from Column Resolution, Inc., was used to chromatograph the samples. The regular column set is designed to separate materials with molecular weights between 1 E3 and 1E6 and comprises six columns operated in series, with the columns of the following sizes: 500, 1 E3, 1 E4, 1 E5 1 E6, and 100 Angstroms.

Samples were dissolved in tetrahydrofuran and pressure-filtered through a 0.2 micron alpha cellulose filter. An injection of 150 µL was made for each sample. Data acquisition and reduction work were handled by a HP 9816 computer with Nelson GPC software. Molecular weight data was calibrated using polystyrene standards only.

Inherent Viscosity (IV)

The inherent viscosity, with units of deciliter/gram (dl/g), is measured with a Cannon-Fenske #50 viscometer that was equilibrated in a water bath maintained at 25° C. to measure the flow time of 10 ml of a polymer solution. About 0.2 g of polymerized polymer extracted by Gel Percent method A was dissolved in 100 mL of solvent, composed of 60/40 ratio by weight of ethyl acetate/tetrahydorfuran, to form a concentrated polymer solution. Inherent viscosity was calculated as:

(natural log (t2/t1))/m1 where t1 is the time for 10 mL of pure solvent to pass through the viscometer (in seconds), t2 is the time for 10 mL of the polymer solution to pass through the viscometer (in seconds), and m1 is the weight of the polymer dissolved in 100 milliliters of solvent (in grams).

Polymerized Coating Thickness

The measured thickness of the PSA coating was determined by using a digital micrometer (Type ID-110E, Mitutoyu Mfg Co., Ltd., Japan) to measure the thickness of both the dried coated substrate sample and the uncoated substrate from the same roll of substrate. The value for the thickness of the uncoated substrate is an average of six measurements. The measured coating thickness was then determined by subtracting the thickness of the substrate from the thickness of the coated substrate.

Peel Adhesion

Pressure-sensitive adhesive tape samples cut approximately 1.27 cm wide and at least 12 cm long were tested for 180° peel adhesion to a clean glass plate. Prior to being cut, the samples were placed for 20–30 minutes in an oven set at 65° C. and then allowed to rest for at least 12 hours in a controlled environment in which the temperature was maintained at 22° C. and relative humidity maintained at 50%. The samples were adhered to the glass test surfaces by rolling the tapes with one pass of a 2.1 kilograms (kg) (4.5 lb.) hard rubber roller moving at a speed of about 230 cm/min (90 in/min). The free end was then attached to the adhesion scale of a Model 3M90 slip/peel tester, available from Instrumentors, Inc., (set to record average peel values) and pulled in 180° geometry at a 230 cm/min (90 in/min) peel rate. The free end of the tape was doubled back so the tape was nearly touching itself to cause the angle of removal to be 180°. Peel Adhesion values were measured in oz/0.5 in and converted to N/dm. Adhesive failure was at the interface of the adhesive and the test surface unless noted otherwise. Cohesive failure results in some adhesive from the sample transferring to the test surface and is indicated by a "t" in the tables. Reported values are from a single measurement.

Shear Strength

Shear strength was measured on pressure-sensitive adhesive tape samples at ambient temperatures. The PSA tape was placed for 20 minutes in an oven set at 65° C. and then allowed to rest for at least 12 hours in a controlled environment in which the temperature was maintained at 22° C. and relative humidity maintained at 50%. A section of tape was cut and adhered to a stainless steel panel by hand with a 2.1 kg (4.5 lb.) roller using 6 passes. A 12.7 mm×12.7 mm (0.5 in×0.5 in) portion of tape was in firm contact with the steel panel and an additional end portion of the tape was free. A 1000 gram weight was adhered to the free end portion of the tape. The samples were placed on a rack in a room at 25° C. and 50% relative humidity. The steel test panel was tilted 2° from vertical (creating a 178° angle with the tape) to insure against any peel forces acting on the sample. The amount of time for the tape to separate from the test panel was recorded. The test was typically stopped at 10,000 minutes. Reported values are a measurement from a single sample, except a second sample was usually tested if the first failed in less than 10,000 minutes. Mode of failure was adhesive unless otherwise noted. Cohesive failure resulted in residue on the steel plate. If so much adhesive remained on the steel plate that the sample more or less separated or "split" into two layers, it is noted as "isp." If some adhesive residue remained on the steel plate it is noted as "r"; if a small amount of adhesive residue remained on the steel sheet it is noted as "sr."

Tack

Tack is measured as the maximum force required to separate an adhesive and an adherend at their interface shortly after the two surfaces have been brought into contact under a defined load for a defined duration and at a specified temperature. Tack is measured in grams as the maximum force required to break the adhesive bond between the tip of a clean stainless steel rod (the adherend) and the adhesive. The test was performed on a POLYKEN Probe Tack Tester, Series 400, model 480-2, available from Testing Machines, Inc. The method was conducted at a controlled rate of 1 cm/sec, for a dwell time of 1 sec, at 25° C. A 2.5 cm×2.5 cm sample was placed over a contacting weight of 20 grams (g) and under a mounting weight of 80 g, then the machine was activated to separate the adhesive and the steel rod. The data is reported as the average of four values observed during the test.

EXAMPLES

The following terminology, abbreviations, and trade names are used in the examples:

| Type | Trade Name or Acronym | Description |
|---|---|---|
| acrylate monomer | IOA | iso-octyl acrylate, available from Sartomer Chemical Co., West Chester, PA. |
| acrylate monomer | nBA | n-butyl acrylate, available from Aldrich Chemical Co., St. Louis, MO. |
| acrylate monomer | TDA | Tridecyl acrylate, available from Sartomer Chemical Co., West Chester, PA. |
| acrylate monomer | ENPA | ethoxylated nonyl phenol acrylate, available from Sartomer Chemical Co., West Chester, PA. |
| copolymerizable material | AA | acrylic acid, available from Aldrich Chemical Co., St. Louis, MO. |
| copolymerizable material | CHEMLINK 4500 | 2-polystyryl ethyl methacrylate, available from Sartomer Chemical Co., West Chester, PA. |
| copolymerizable material | NVP | n-vinyl pyrrolidone, available from Aldrich Chemical Co., St. Louis, MO. |
| copolymerizable material | 2-EHA | 2-ethyl hexyl acrylate, available from Sartomer Chemical Co., West Chester, PA. |
| copolymerizable material | MMA | methyl methacrylate, available from Aldrich Chemical Co., St. Louis, MO. |
| copolymerizable material | EOEA | ethyloxy ethyl acrylate, available from Aldrich Chemical Co., St. Louis, MO. |
| copolymerizable material | B-CEA | β-carboxy ethyl acrylate available from Rhone-Poulenc, Inc., Cranberry, NJ |
| copolymerizable material | ACM | acrylamide, available from Aldrich Chemical Co., St. Louis, MO. |
| copolymerizable material | VAc | vinyl acetate, available from Aldrich Chemical Co., St. Louis, MO. |
| copolymerizable material | CW-750 | poly(ethylene oxide) acrylate, polyfunctional, MW = 750, available from Union Carbide Chemicals and Plastics Co., Gary, IN. |
| copolymerizable material | HEA | hydroxyl ethyl acrylate, available from Aldrich Chemical Co., St. Louis, MO. |
| copolymerizable material | AM-90G | acrylate polyehylene oxide, polyfunctional polymerizable oligomer, MW of 550, available from Shin-Nakamura Chemical Co., Japan. |
| surfactant | SIPONIC Y-500-70 | polyoxyethylene(25) oleyl ether, nonionic, HLB = 16.1, available from Americal Alcolac Chemical Co., Baltimore, MD. |
| surfactant | VARIQUAT 50MC | trimethyl akyl (C12–C16) benzyl ammonium chloride, cationic, available from Witco Corp., Greenwich, CT. |
| surfactant | SIPONATE DS-10 | sodium dodecyl benzene sulfonate, anionic, available from Rhone-Poulenc, Inc., Cranberry, NJ. |
| surfactant | TEXAPON L-100 | sodium lauryl sulfate, anionic, available from Henkel, Inc., Cincinnatti, OH. |
| surfactant | MAZON SAM-211-80 | alkylene polyalkoxy sulfate, copolymerizable, available from PPG Industries, Gurnee, IL. |
| surfactant | HS-10 | o-propylene-p-alkyl phenolpolyethoxy amonium sulfate, polymerizable, available from DKS, International, Inc., Japan. |
| surfactant | SERMUL EN-145 | Nonyl phenol ethoxylated, available from Servo Delden B.V., Delden, Netherlands |
| suspending agent | ACRYSOL A3 | polyacrylic acid, MW = 190, available from Rohm and Haas Corp., Philadelphia, PA. |
| suspending agent | VINOL 350 | polyvinyl alcohol available from Air Products, Allentown, PA. |
| crosslinker | TMPTA | trimethylopropane triacrylate, multifunctional, available from Radcure Specialties, Inc., Chicago, IL. |
| crosslinker | HDDA | 1,6-hexadiol diacrylate, difunctionsl, available from Aldrich Chemical Co., St. Louis, MO. |
| crosslinker | $CHCl_3$ | trichioromethane, an indirect crosslinking promoter, available from Aldrich Chemical Co., St. Louis, MO. |
| crosslinker | PTTG | pentaerythritol tetraacrylate available from ARCO Specialty Chemicals Co., New Town Square, PA.. |
| chain transfer agent | $CBr_4$ | carbontetrabromide available from Aldrich Chemical Co., St. Louis, MO. |

-continued

| Type | Trade Name or Acronym | Description |
| --- | --- | --- |
| chain transfer agent | IOTG | isooctyl thioglycolate available from Aldrich Chemical Co., St. Louis, MO. |
| chain transfer agent | n-DM | n-dodecyl mercaptan available from Aldrich Chemical Co., St. Louis, MO. |
| non-copolymerizable additive | ELVACITE 1020 ELVACITE 1010 | polymethacrylate, available from ICI Acrylics, Wilimington, DE. |
| thickener | UCAR POLYPHOBE 104 | acrylic latex available from Union Carbide Chemicals and Plastics Co., Gary, IN. |
| thickener | NALCO 2327 | colloidal silicas, available from Nalco Chemical Co., Naperville, IL. |
| thickener | SNOWTEX UP | colloidal silicas, available from Nissan Chemical Industries, LTD., Tokyo, Japan |
| thickener | corn starch | available as ARGO brand from Best Food Div. CPC International, Inc., Englewood Cliffs, NJ |
| thickener | CAB-O-SIL M5 | hydrophilic silica, available from Cabot Corporation, Tuscola, IL. |
| thickener | NALCO 1034A | colloidal silica, available from Nalco Chemical Co., Naperville, IL. |
| thickener or reactive material | syrup | a mixture of 90/10 isooctyl acrylate and acrylic acid that has been partially polymerized by ultraviolet light irradiation to a viscosity of about 500 cp and made according to U.S. Pat. No. 5,028,484, Ex. 19–26. |
| tackifier | PICCOLYTE A-75 | piccolastic resin, poly styrene available from Hercules Chemical Co., Wilmington, DE. |
| tackifier | WINGTACK PLUS | modified hydrocarbon resin, aliphatic hydrocarbon resin available from Goodyear Tire and Rubber Co., Arkon, OH |
| tackifier | ARKON P-90 | saturated hydrocarbon resin available from Hercules Chemical Co., Wilmington, DE. |
| tackifier | EASTOTAC H-100R | hydrogenated resin available from Eastman Chemical Co., Kingsport, TN. |
| tackifier | FORAL 85 | rosin glycerol ester available from Hercules Chemical Co., Wilmington, DE. |
| tackifier | ESCOREZ 1310 | synthetic hydrocarbon resin available from Exxon Chemical Co., Houston, TX. |
| tackifier | PICCOLYTE S-115 | polyterpene resin available from Hercules Chemical Co., Wilmington, DE. |
| photoinitiator | IRGACURE 2959 | H-(α-hydroxyethyl)-phenyl-(2-hydroxy propyl) ketone available from Sartomer Chemical Co., West Chester, PA. |
| photoinitiator | IRGACURE 184 | hydroxy-cyclohexyl-phenyl-ketone available from Sartomer Chemical Co., West Chester, PA. |
| substrate | treated PET | polyethylene terephthalate film chemically treated an aminated polybutadiene priming agent, 38 micrometers thick |
| substrate | untreated PET | polyethylene terephthalate, 38 micrometers thick |
| substrate | silicone liner | silicone-coated PET |
| substrate | BOPP | biaxially oriented polypropylene, 38 micrometer thick |

Throughout the Examples, the Specification and the claims, all parts, percentages, and ratios are by weight unless otherwise indicated. Parts of any precursor emulsion components, other than reactive materials, is based on 100 parts by weight of the reactive materials. Most measurements were recorded in English units and converted to SI units.

Examples 1–5

Examples 1–5 illustrate the effect of e-beam polymerizing basic emulsions on web to make pressure-sensitive articles.

In Example 1, a premixture was prepared by combining 96 parts acrylate monomer, IOA, and 4 parts copolymerizable material, AA, in a glass jar and shaking the mixture by hand. In a beaker, an acrylate emulsion was made by adding 1.0 part surfactant, SIPONIC Y-500-70, to 43 parts of deionized water (using approximately 10 grams of water) and agitating the mixture with a homogenizing mixer, available as model 17105 from Omni Corp. International, Waterbury, Conn., set at dial setting "4" (medium speed) (maximum speed="10," representing revolutions/minute of 16,000 N.L.) until the surfactant and water formed a consistent, milky white, foamed emulsion mixture. The premix was then added to the foamed emulsion mixture in small increments while the homogenizing mixer was set at dial setting "7" (high agitation). The premix was added in increments of approximately $\frac{1}{5}^{th}$ to $\frac{1}{10}^{th}$ of the premix. Each increment was allowed to completely homogenize before the next increment was added. If the premix was added too quickly, the emulsion would not foam. The beaker was often manipulated (tilted) to expose the mixing mechanism to air, thereby introducing air into the emulsion to increase foaming. The combined mixtures, referred to herein as the precursor emulsion, were further agitated at high speed, dial setting "7" for about 2 seconds to ensure an oil-in-water emulsion was formed having (1) an polymerizable content of about 70 wt. %, (2) a uniform distribution of acrylate-based oil droplets having a diameter of less than 1.0 μm as observed under an optical microscope, and (3) a viscosity between 1800 and 8500 centipoise as measured with a Brookfield Viscometer, Spindle No. 3, at 12 rpm, and 24° C.

The precursor emulsion was then coated onto the treated side of a primed PET substrate with a knife coater set at a gap of 50–75 micrometers. The coated substrate was taped, with the coated side exposed to air, onto a carrier web. The carrier web was threaded through the self-shield radiation chamber of an accelerated electron source, available under the tradename CB-300 ELECTROCURTAIN, from Energy Sciences, Inc., Woburn, Mass., which has a length of e-beam illumination of 14 cm. The accelerated electron source was operated at 190 kilo-electron volts (keV). The coated film was run "open faced", i.e., uncovered, with nitrogen purging of the chamber to provide a substantially inert atmosphere (approximately 100 ppm oxygen as determine by an oxygen meter available as model FAH 05 005 from Delta F, Woburn, MA.) The inert atmosphere excludes oxygen which interferes with free radical polymerization. The coated substrate was passed through the accelerated electron source twice. The line speed for each pass was 3.0 m/min (10 fpm). The dose during each pass was 70 kGy. The exposure was done under adiabatic conditions at ambient temperature. The precursor emulsion coating polymerized into a pressure-sensitive adhesive coating.

In Examples 2–4, rectangles of pressure-sensitive adhesive articles were made as in Example 1 except the surfactant concentration was 2.0 parts, 3.0 parts and 4.0 parts, respectively.

In Example 5, sheets of pressure-sensitive adhesive articles were made as in Example 1 except the surfactant was VARIQUAT 50MC.

All examples were measured for polymerized coating thickness, peel adhesion and shear strength.

Example 6

Example 6 illustrate the effect of different doses and residence times on the properties of the resulting pressure-sensitive adhesive articles.

The pressure-sensitive adhesive articles of Example 6 were made in a manner similar to that of Example 1 except: (1) the components of the emulsion were 95 parts IOA (acrylate monomer), 4 parts AA (free-radically copolymerizable material), 1 part CHEMLINK 4500 (C-4500) (free-radically copolymerizable material), and 0.52 parts surfactant, SIPONATE DS-10 (S DS-10) (2) the substrate was unprimed polyethylene terephthalate having a thickness of 51 micrometers; (3) the accelerated electron source was operated at 220 keV; and (4) the processing conditions were varied as indicated in Table 2. All samples had an polymerizable content of 70%. The polymerized samples were measured for gel content (Method A), molecular weight (MW) and inherent viscosity (IV).

The weight % polymer for the samples in Table 2 was determined using a gas chromatography method. 0.1 to 0.2 grams of polymerized/crosslinked sample was weighed into a glass vial fitted with a cap that is inert to the solvent. A 20 fold amount of acetone/IST mixture was added. The samples were allowed to stand overnight to allow extraction of the residuals. Weight % polymer is expressed as ((area of component peak(s))/area of IST peak)×CF×DRF where CF=(amount of internal standard/mass of polymer)× 100;
DFR=AR/MR;
the IST (internal standard) is 0.0004 g of 1,5-pentane diol per gram of acetone and has by definition a detector response of 1;

TABLE 1

| | Reactive Materials | | Surfactant | | Thickness | Dose per pass | # of passes | speed | Resid. Time | Peel | Shear |
|---|---|---|---|---|---|---|---|---|---|---|---|
| Example | Type | Parts | Type | Parts | (μm) | (kGy) | passes | (cm/s) | (sec) | (N/dm) | (min) |
| 1 | IOA/AA | 96/4 | SIPONIC Y-500-70 | 1 | 30 | 70 | 2 | 5.0 | 5.6 | 30 | 28/30 |
| 2 | IOA/AA | 96/4 | SIPONIC Y-500-70 | 2 | 29 | 70 | 2 | 5.0 | 5.6 | 25 | 45/54 |
| 3 | IOA/AA | 96/4 | SIPONIC Y-500-70 | 3 | 32 | 70 | 2 | 5.0 | 5.6 | 24 | 21/23 |
| 4 | IOA/AA | 96/4 | SIPONIC Y-500-70 | 4 | 33 | 70 | 2 | 5.0 | 5.6 | 19 | 23/25 |
| 5 | IOA/AA | 96/4 | VARIQUAT 50MC | 1 | 33 | 70 | 2 | 5.0 | 5.6 | 29.8 | 39/43 |

Examples 6–16

These examples typically add a second free-radically copolymerizable material to the precursor emulsion.

AR(actual ratio)=grams component/grams internal standard;

MR (measured ratio)=peak area of component/peak area of internal standard.

TABLE 2

| | Reactive Materials | | Surfactant | | Dose per pass | # of | Speed | Resid. Time | Weight % | Gel Content | Mw × | IV |
|---|---|---|---|---|---|---|---|---|---|---|---|---|
| Example | Type | Parts | Type | Parts | (kGy) | Passes | (cm/s) | (sec) | polymer | % | 1000 | (dL/g) |
| 6A | IOA/AA/C-4500 | 95/4/1 | S DS-10 | 0.5 | 10 | 2 | 12.7 | 2.2 | 57.2 | 40.4 | 465 | 0.66 |
| 6B | IOA/AA/C-4500 | 95/4/1 | S DS-10 | 0.5 | 10 | 4 | 12.7 | 4.4 | 88.4 | 61.6 | 253 | 0.57 |
| 6C | IOA/AA/C-4500 | 95/4/1 | S DS-10 | 0.5 | 10 | 6 | 12.7 | 6.6 | 90.7 | 65.6 | 122 | 0.51 |
| 6D | IOA/AA/C-4500 | 95/4/1 | S DS-10 | 0.5 | 10 | 8 | 12.7 | 8.8 | 98.8 | 69.3 | 82 | 0.50 |
| 6E | IOA/AA/C-4500 | 95/4/1 | S DS-10 | 0.5 | 20 | 2 | 12.7 | 2.2 | 72.0 | 53.1 | 480 | 0.67 |
| 6F | IOA/AA/C-4500 | 95/4/1 | S DS-10 | 0.5 | 20 | 4 | 12.7 | 4.4 | 93.0 | 60.5 | 118 | 0.52 |
| 6G | IOA/AA/C-4500 | 95/4/1 | S DS-10 | 0.5 | 20 | 6 | 12.7 | 6.6 | 97.8 | 69.6 | 71 | 0.34 |
| 6H | IOA/AA/C-4500 | 95/4/1 | S DS-10 | 0.5 | 20 | 8 | 12.7 | 8.8 | 98.8 | 75.8 | 53.6 | 0.25 |
| 6I | IOA/AA/C-4500 | 95/4/1 | S DS-10 | 0.5 | 40 | 2 | 12.7 | 2.2 | 85.1 | 66.1 | 226 | 0.50 |
| 6J | IOA/AA/C-4500 | 95/4/1 | S DS-10 | 0.5 | 40 | 4 | 12.7 | 4.4 | 95.8 | 83.5 | 56.8 | 0.46 |

TABLE 2-continued

| Example | Reactive Materials Type | Parts | Surfactant Type | Parts | Dose per pass (kGy) | # of Passes | Speed (cm/s) | Resid. Time (sec) | Weight % polymer | Gel Content % | Mw × 1000 | IV (dL/g) |
|---|---|---|---|---|---|---|---|---|---|---|---|---|
| 6K | IOA/AA/C-4500 | 95/4/1 | S DS-10 | 0.5 | 40 | 6 | 12.7 | 6.6 | 98.7 | 64.2 | 45 | 0.28 |
| 6L | IOA/AA/C-4500 | 95/4/1 | S DS-10 | 0.5 | 40 | 8 | 12.7 | 8.8 | 98.7 | 80.9 | 31.9 | 0.15 |
| 6M | IOA/AA/C-4500 | 95/4/1 | S DS-10 | 0.5 | 35 | 1 | 3.5 | 4.0 | 80.9 | 76.0 | 260 | 0.71 |
| 6N | IOA/AA/C-4500 | 95/4/1 | S DS-10 | 0.5 | 35 | 1 | 7.7 | 1.8 | 56.9 | 65.3 | 435 | 0.55 |
| 6O | IOA/AA/C-4500 | 95/4/1 | S DS-10 | 0.5 | 35 | 1 | 12.7 | 1.1 | 55.0 | 49.5 | 322 | 0.45 |
| 6P | IOA/AA/C-4500 | 95/4/1 | S DS-10 | 0.5 | 50 | 1 | 3.5 | 4.0 | 81.1 | 83.2 | 222 | 0.81 |
| 6Q | IOA/AA/C-4500 | 95/4/1 | S DS-10 | 0.5 | 50 | 1 | 5.0 | 2.8 | 51.8 | 61.2 | 264 | |
| 6R | IOA/AA/C-4500 | 95/4/1 | S DS-10 | 0.5 | 50 | 1 | 7.7 | 1.8 | 71.1 | 71.6 | 440 | 0.64 |
| 6S | IOA/AA/C-4500 | 95/4/1 | S DS-10 | 0.5 | 50 | 1 | 12.7 | 1.1 | 66.3 | 47.4 | 306 | 0.43 |

Example 7

Example 7 shows the effect of various process conditions on the properties of the resulting pressure-sensitive adhesives.

In Example 7, PSA articles were made as in Example 6 except (1) 0.53 parts SIPONATE DS-10 was used, (2) the accelerated electron source was operated at 290 keV, and (3) the processing conditions were as shown in Table 3. The samples were measured for peel adhesion, shear strength and tack.

TABLE 3

| Example | Reactive Materials Type | Parts | Surfactant Type | Parts | Dose per pass (kGy) | # of Passes | Speed (cm/s) | Resid. Time (sec) | Peel (N/dm) | Shear (min) | Tack (gram) |
|---|---|---|---|---|---|---|---|---|---|---|---|
| 7A | IOA/AA/C-4500 | 95/4/1 | S DS-10 | 0.5 | 30 | 2 | 3.5 | 8.0 | 12.1 | 8 sp | 712 |
| 7B | IOA/AA/C-4500 | 95/4/1 | S DS-10 | 0.5 | 50 | 2 | 3.5 | 8.0 | 10.1 | 47 | 834 |
| 7C | IOA/AA/C-4500 | 95/4/1 | S DS-10 | 0.5 | 20 | 1 | 5.0 | 2.8 | 2.5t | 0 sp | 107 |
| 7D | IOA/AA/C-4500 | 95/4/1 | S DS-10 | 0.5 | 20 | 2 | 5.0 | 5.6 | 8.2 | 1 sp | 693 |
| 7E | IOA/AA/C-4500 | 95/4/1 | S DS-10 | 0.5 | 20 | 3 | 5.0 | 8.4 | 13.8 | 26 | 802 |
| 7F | IOA/AA/C-4500 | 95/4/1 | S DS-10 | 0.5 | 20 | 4 | 5.0 | 11.2 | 8.5 | 97 | 524 |
| 7G | IOA/AA/C-4500 | 95/4/1 | S DS-10 | 0.5 | 20 | 5 | 5.0 | 14.0 | 10.8 | 55 | 545 |
| 7H | IOA/AA/C-4500 | 95/4/1 | S DS-10 | 0.5 | 20 | 6 | 5.0 | 16.8 | 7.3 | 11 | 823 |
| 7I | IOA/AA/C-4500 | 95/4/1 | S DS-10 | 0.5 | 30 | 3 | 5.0 | 8.4 | 10.8 | 11 | 551 |
| 7J | IOA/AA/C-4500 | 95/4/1 | S DS-10 | 0.5 | 50 | 1 | 5.0 | 2.8 | 5.8 | 1 sp | 354 |
| 7K | IOA/AA/C-4500 | 95/4/1 | S DS-10 | 0.5 | 50 | 2 | 5.0 | 5.6 | 15.7 | 25 | 860 |
| 7L | IOA/AA/C-4500 | 95/4/1 | S DS-10 | 0.5 | 50/50/20 | 3 | 5.0/5.0/12.7 | 8.4 | 8.2 | 137 | 504 |
| 7M | IOA/AA/C-4500 | 95/4/1 | S DS-10 | 0.5 | 50 | 2 | 10.2 | 2.8 | 13.1 | 2 | 496 |
| 7N | IOA/AA/C-4500 | 95/4/1 | S DS-10 | 0.5 | 50 | 2 | 12.7 | 2.2 | 16.3 | 8 r | 857 |

Examples 8–12

Examples 8–12 show the effect of various concentrations of reactive materials on the properties of the resulting pressure-sensitive adhesives.

In Examples 8–12, pressure-sensitive adhesive articles were made in a manner similar to Example 6 except (1) the concentrations of IOA and AA were varied as shown in Table 4, (2) the accelerated electron source was operated at 220 keV, and (3) the processing conditions were varied as shown in Table 4. The samples were measured for peel adhesion, shear strength and tack.

TABLE 4

| Example | Reactive Materials Type | Parts | Surfactant Type | Parts | Dose per pass (kGy) | # of Passes | Speed (cm/s) | Resid. Time (sec) | Peel (N/dm) | Shear (min) | Tack (gram) |
|---|---|---|---|---|---|---|---|---|---|---|---|
| 8 | IOA/AA/C-4500 | 97/2/1 | S DS-10 | 0.5 | 10 | 5 | 12.7 | 5.51 | 39 | 11 | 369 |
| 9 | IOA/AA/C-4500 | 95/4/1 | S DS-10 | 0.5 | 10 | 5 | 12.7 | 5.51 | 28 | 11 | 523 |
| 10 | IOA/AA/C-4500 | 94/5/1 | S DS-10 | 0.5 | 10 | 5 | 12.7 | 5.51 | 37 | 27 | 388 |
| 11 | IOA/AA/C-4500 | 92/7/1 | S DS-10 | 0.5 | 10 | 5 | 12.7 | 5.51 | 21 | 20 | 386 |
| 12 | IOA/AA/C-4500 | 89/10/1 | S DS-10 | 0.5 | 10 | 5 | 12.7 | 5.51 | 7 | 0 | 252 |

Examples 13 and 14

Examples 13 and 14 show varying the precursor emulsion composition for a given substrate.

In Examples 13 and 14, pressure-sensitive adhesive tapes were made in a manner similar to Example 6 except: (1) in Example 13, the ratio of IOA/AA/CHEMLINK 4500 was 97/2/1 and the substrates used were as indicated in Table 5; (2) in Example 14, the ratio of IOA/AA/CHEMLINK 4500 was 99/0/1, and the substrates used were as indicated in Table 5; (3) each sample was passed under the accelerated electron source 5 times, each time at a speed of 12.7 cm/sec (2.5 fpm), at a dose of 10 kGy. The samples were measured for peel adhesion, shear strength and tack.

TABLE 5

| Example | Reactive Materials Type | Parts | Surfactant Type | Parts | Substrate | Dose per pass (Kgy) | # of passes | Speed (cm/s) | Resid. time (sec) | Peel (N/dm) | Shear (min) | Tack (gram) |
|---|---|---|---|---|---|---|---|---|---|---|---|---|
| 13A | IOA/AA/C-4500 | 97/2/1 | S DS-10 | 0.5 | treated PET | 10 | 5 | 12.7 | 5.51 | 40 | 11 | 487 |
| 13B | IOA/AA/C-4500 | 97/2/1 | S DS-10 | 0.5 | PET | 10 | 5 | 12.7 | 5.51 | 61 | 12 sp | 685 |
| 13C | IOA/AA/C-4500 | 97/2/1 | S DS-10 | 0.5 | silcone liner | 10 | 5 | 12.7 | 5.51 | 56 | 8 | 560 |
| 13D | IOA/AA/C-4500 | 97/2/1 | S DS-10 | 0.5 | BOPP | 10 | 5 | 12.7 | 5.51 | 57 | 12 r | 798 |
| 14A | IOA/C-4500 | 99/1 | S DS-10 | 0.5 | treated PET | 10 | 5 | 12.7 | 551 | 24 | 6 | 365 |
| 14B | IOA/C-4500 | 99/1 | S DS-10 | 0.5 | PET | 10 | 5 | 12.7 | 5.51 | 55 | 3 sp | 657 |
| 14C | IOA/C-4500 | 99/1 | S DS-10 | 0.5 | silicone liner | 10 | 5 | 12.7 | 5.51 | 42 | 4 sp | 600 |

The emulsion coatings, polymerized on-web, generally adhered well to the given substrates. If they had not no peel values would have been obtainable. The coatings even adhered well to substrates that normally require chemical or physical treatment to achieve adhesion between the coating and substrate, e.g., untreated PET and BOPP.

Examples 15 and 16

Examples 15 and 16 show the effect of various surfactant concentrations, temperatures, total dose, and residence time on the properties of the resulting PSAs.

In Examples 15 and 16 pressure-sensitive adhesive articles were made as in Example 6 except: (1) the process conditions were as listed in Table 6, and (2) the surfactant in Example 16 was TEXAPOL L100 (T L100). Example 15A was made with three passes at ambient temperatures, with doses of 50, 50, and 20 kGy, respectively, each pass at a speed of about 12.67 cm/sec (25 fpm). Example 1 5B was made with one pass at a speed of about 12.67 (25 fpm) and a dose of 100 kGy.

Examples 15C and 15D were processed in a similar manner except the carrier web was contacted with half of the circumference of a metal drum, controlled to an average temperature of about 8° C. (47° F.) with chilled water. The temperature of the samples as they were exposed to the accelerating electrons was maintained at the temperature of the drum. The web was conveyed by and between two co-rotating nip rolls, one positioned on each side of the web. The open face coated articles were processed on the drum by wrapping the edges of the nip rolls with thick PLASTI-FORM or SANDBLAST STENCIL materials, available from Minnesota Mining and Manufacturing, St. Paul, Minn. Wrapping the edges of the nip rolls provided clearance between the coated portion of the web and the center portion of the nip rolls. The samples were measured for peel adhesion and shear strength.

TABLE 6

| Example | Reactive Materials Type | Parts | Surfactant Type | Parts | Temp. °C. | # of Passes | Dose per pass kGy | Speed (cm/sec) | Resid. time (sec) | Peel N/dm | Shear min |
|---|---|---|---|---|---|---|---|---|---|---|---|
| 15A | IOA/AA/C-4500 | 95/4/1 | S DS-10 | 0.5 | 22 | 3 | 50/50/20 | 5.1/5.1/12.7 | 6.62 | 17 | 1 |
| 15B | IOA/AA/C-4500 | 95/4/1 | S DS-10 | 0.5 | 22 | 1 | 100 | 5.1 | 2.76 | 40 | 12 |
| 15C | IOA/AA/C-4500 | 95/4/1 | S DS-10 | 0.5 | 8 | 3 | 50/50/20 | 5.1/5.1/12.7 | 6.62 | 45 | 9 sp |
| 1SD | IOA/AA/C-4500 | 95/4/1 | S DS-10 | 0.5 | 8 | 1 | 100 | 5.1 | 2.76 | 71 t | 0 sp |
| 16A | IOA/AA/C-4500 | 95/4/1 | TL-100 | 0.5 | 22 | 3 | 50/50/20 | 5.1/5.1/12.7 | 6.62 | 26 | 25 |
| 16B | IOA/AA/C-4500 | 95/4/1 | TL-100 | 0.5 | 22 | 1 | 100 | 5.1 | 2.76 | 12 | 4 sr |
| 16C | IOA/AA/C-4500 | 95/4/1 | TL-100 | 0.5 | 8 | 3 | 50/50/20 | 5.1/5.1/12.7 | 6.62 | 30 | 8 sr |
| 16D | IOA/AA/C-4500 | 95/4/1 | TL-100 | 0.5 | 8 | 1 | 100 | 5.1 | 2.76 | 44 | 1 sp |

Examples 17–25

Examples 17–25 illustrate the effect on the resulting pressure-sensitive adhesive articles of adding crosslinkers to the precursor emulsion.

Example 17 was made in a manner similar to Example 15A except at ambient temperature. Examples 18–25 were made in a manner similar to Example 17 except (1) examples 18–21 were made with a crosslinker, TMPTA, in the amount of 0.25 parts, 0.5 parts, 0.75 parts and 1.0 part, respectively, and (2) examples 22–25 were made with a crosslinker, HDDA, in the amount of 0.25 parts, 0.5 parts, 0.75 parts and 1.0 part, respectively. All examples were measured for adhesive thickness, peel adhesion and shear strength.

crosslinking agent were added to the precursor emulsion, the resulting PSAs exhibited high shear strength (in excess of 10,000 minutes) while maintaining tack and peel adhesion properties of the PSA.

Examples 26–31

Examples 26–29 show the effects of varying dose, composition of reactive materials, and surfactant for precursor emulsions containing 1 part crosslinker.

TABLE 7

| Example | Reactive Materials Type | Parts | Surfactant Type | Parts | Crosslinker Type | Parts | Dose per pass (Kgy) | # of Passes | Speed (cm/sec) | Resid time (sec) | Thickness (μm) | Peel (N/dm) | Shear (min) |
|---|---|---|---|---|---|---|---|---|---|---|---|---|---|
| 17 | IOA/AA | 96/4 | S DS-10 | 0.5 | none | none | 50 | 2 | 5.0 | 5.6 | — | 34.5 | 25 |
| 18 | IOA/AA | 96/4 | S DS-10 | 0.5 | TMPTA | 0.25 | 50 | 2 | 5.0 | 5.6 | 1.8 | 7.0 | 108/216 |
| 19 | IOA/AA | 96/4 | S DS-10 | 0.5 | TMPTA | 0.5 | 50 | 2 | 5.0 | 5.6 | 2.0 | 5.3 | 37/41 |
| 20 | IOA/AA | 96/4 | S DS-10 | 0.5 | TMPTA | 0.75 | 50 | 2 | 5.0 | 5.6 | 1.7 | 4.1 | 291/4830 |
| 21 | IOA/AA | 96/4 | S DS-10 | 0.5 | TMPTA | 1.0 | 50 | 2 | 5.0 | 5.6 | 2.0 | 2.9 | 4055/10 k+ |
| 22 | IOA/AA | 96/4 | S DS-10 | 0.5 | HDDA | 0.25 | 50 | 2 | 5.0 | 5.6 | — | 12.7 | 62 |
| 23 | IOA/AA | 96/4 | S DS-10 | 0.5 | HDDA | 0.5 | 50 | 2 | 5.0 | 5.6 | — | 13.0 | 40 |
| 24 | IOA/AA | 96/4 | S DS-10 | 0.5 | HDDA | 0.75 | 50 | 2 | 5.0 | 5.6 | — | 12.4 | 28 |
| 25 | IOA/AA | 96/4 | S DS-10 | 0.5 | HDDA | 1.0 | 50 | 2 | 5.0 | 5.6 | — | 12.0 | 60 |

The results indicate that adding crosslinker, even in amounts greater than 0.5 parts will increased shear strength while still providing tack. This was unexpected because, typically, adding more than about 0.5 parts by weight of crosslinker to a PSA precursor produces a decrease in the tack of the resulting article so severe that it will not adhere to a surface well enough to be tested for peel adhesion. Normally the presence of small amounts (e.g., less than 0.5 parts by weight) of crosslinker improves the shear strength of a PSA, but greater amounts can reduce or eliminate the tack of the PSA. Surprisingly, the inventors found that when higher than normal levels, i.e., more than 0.5 part, of Example 26A-26C were made in a manner similar to Example 6 except (1) 1.0 part crosslinker, TMPTA, was added to the precursor emulsion (2) the source of accelerated electrons was a Model 7700 ELECTROCURTAIN, equipped with a double gun cathode, available from Energy Sciences, Inc., Woburn, MA, operated at 220 keV. Nitrogen purging kept the concentration of oxygen in the chamber to about 3000 parts per million (ppm), as continuously measured with an oxygen meter available as model FA1, Spec. 62, from Energy, Sciences, Inc, Woburn, Mass., (3) samples were passed through the accelerated electron source for a single pass at a speed of 5.0 cm/sec (10 fpm) at the doses shown in Table 8. The pressure-sensitive adhesive articles of Examples 27A–27D, 28 and 29 were made as in Example 26 except (1) the ratio of IOA/AA/CHEMLINK 4500 was 96/4/0; (2) the surfactant used was 1.0, 2.0, 3.0, and 4.0 parts of TEXAPON L-100 for Examples 27A–27D, respectively, 1.0 part SIPONICY-500-70 for Example 28, and 2.0 parts SIPONATE DS-10 for Example 29; (3) Examples 27A–27D were polymerized using the CB-175 ELECTROCURTAIN electron beam generator. The CB-175 was modified by adding a 50:1 ratio gear box, air bleed valve, oxygen monitor, and digital amp meter. Examples 30 and 31 were made as Example 27A except (1) the reactive materials were partially prepolymerized into syrup before being emulsified; (2) the ration of IOA/AA syrup was 90/10; (3) Example 30 used a nonionic surfactant, nonyl phenol ethoxylated, available under the trade name SERMUL EN-145 from servo Delden B.V., Delden, Netherlands; and (4) Example 31 used a nonionic surfactant, octylphenoxy ethanol, available as TRITON X-165 from Union Carbide Chemicals and Plastics, Gary, Ind.

All examples were measured for thickness, weight % polymer, swell, peel adhesion and shear strength.

TABLE 8A

| Example | Reactive Materials | | Surfactant | |
| | Types | Parts | Type | Parts |
| --- | --- | --- | --- | --- |
| 26A | IOA/AA/C-4500 | 95/4/1 | S DS-10 | 0.5 |
| 26B | IOA/AA/C-4500 | 95/4/1 | S DS-10 | 0.5 |
| 26C | IOA/AA/C-4500 | 95/4/1 | S DS-10 | 0.5 |
| 27A | IOA/AA | 96/4 | T L-100 | 1.0 |
| 27B | IOA/AA | 96/4 | T L-100 | 2.0 |
| 27C | IOA/AA | 96/4 | T L-100 | 3.0 |
| 27D | IOA/AA | 96/4 | T L-100 | 4.0 |
| 28 | IOA/AA | 96/4 | S Y-500-70 | 1.0 |
| 29 | IOA/AA | 96/4 | SDS-10 | 2.0 |
| 30 | IOA/AA syrup | 90/10 | SERMUL EN 145 | 1.0 |
| 31 | IOA/AA syrup | 90/10 | TRITON X-165 | 1.0 |

Examples 32–34

Examples 32–34 show the effects of varying dose, composition of reactive materials, and residence times for precursor emulsions containing 1.0 part cross linker.

Examples 32–34 were made in a manner similar to Example 26 except: (1) in Example 33 a non-copolymerizable polymer, ELVACITE 1010 (E 1010), was used instead of a second free-radically copolymerizable material (C-4500); (2) in Example 34, an indirect crosslinking promoter, $CHCl_3$, was added in the amount of 5 parts per 100 parts reactive materials; (3) processing conditions were as shown in Table 9; (4) Examples 32 and 33 used a CB-175 ELECTORCURTAIN, operated at 175 keV, as an accelerated electron source; and (5) in Example 34, the accelerated electron source was a CB-300 ELECTROCURTAIN operated at a voltage of 220keV.

All samples had an polymerizable content of 70%.

Each sample was measured for gel percent, adhesive thickness, peel adhesion and shear strength.

TABLE 8B

| Example | TMPTA parts | Dose Per pass (kGy) | # of Passes | Speed (cm/sec) | Resid. time (sec) | Polym. % | Weight % Polymer | Thickness ($\mu$m) | Swell % | Peel (N/dm) | Shear (min) |
| --- | --- | --- | --- | --- | --- | --- | --- | --- | --- | --- | --- |
| 26A | 1.0 | 50 | 1 | 5.0 | 7.0 | 80 | 84.4 | 36 | 1019 | 28 | 96/301 |
| 26B | 1.0 | 70 | 1 | 5.0 | 7.0 | 80 | 82.7 | 43 | 1276 | 26 | 75/286 |
| 26C | 1.0 | 90 | 1 | 5.0 | 7.0 | 80 | 90.1 | 41 | — | 14 | 24/34 |
| 27A | 1.0 | 70 | 2 | 5.0 | 2.0 | 70 | 100 | 48 | — | 6 | 205/328 |
| 27B | 1.0 | 70 | 2 | 5.0 | 2.0 | 70 | 98.5 | 52 | — | 19 | 949/10 k+ |
| 27C | 1.0 | 70 | 2 | 5.0 | 2.0 | 70 | 98.3 | 51 | — | 4 | 1266/10 k+ |
| 27D | 1.0 | 70 | 2 | 5.0 | 2.0 | 70 | 95.0 | 51 | — | 5 | 1792/10 k+ |
| 28 | 1.0 | 70 | 1 | 5.0 | 7.0 | 80 | 83.6 | 33 | 898 | 27 | 3521/10 k+ |
| 29 | 1.0 | 70 | 1 | 5.0 | 7.0 | 80 | 90.9 | 43 | — | 12 | 1/1 |
| 30 | 1.0 | 120 | 1 | 2.5 | 3.9 | — | — | 28 | — | 24 | 10 k+ |
| 31 | 1.0 | 120 | 1 | 2.5 | 3.9 | — | — | 33 | — | 16 | 4402/6770 |

TABLE 9

| Example | Reactive Materials Type | Parts | Surfactant Type | Parts | Crosslinker Type | parts Parts | Dose per pass (kGy) | Speed (cm/s) | # of Passes | Resid. time (sec) | Thickness (μm) | Cured non-vol. % | Gel % | Peel (N/dm) | Shear (min) |
|---|---|---|---|---|---|---|---|---|---|---|---|---|---|---|---|
| 32A | IOA/AA/C-4500 | 95/4/1 | S DS-10 | 0.50 | TMPTA | 1.0 | 75 | 1 | 1 | 10 | 51 | 97.9 | 96.2 | 5.5 | 10 k+ |
| 32B | IOA/AA/C-4500 | 95/4/1 | S DS-10 | 0.50 | TMPTA | 1.0 | 90 | 1 | 1 | 10 | 58 | 88.2 | 95.4 | 5.9 | 10 k+ |
| 32C | IOA/AA/C-4500 | 95/4/1 | S DS-10 | 0.50 | TMPTA | 1.0 | 90 | 2 | 1 | 5 | 38 | 87.6 | 93.8 | 6.3 | 1886 |
| 32D | IOA/AA/C-4500 | 95/4/1 | S DS-10 | 0.50 | TMPTA | 1.0 | 120 | 2 | 1 | 5 | 48 | 88.4 | 94.0 | 7.2 | 500 |
| 33A | IOA/AA/E-1010 | 95/4/1 | S DS-10 | 0.50 | TMPTA | 1.0 | 75 | 1 | 1 | 10 | 38 | 90.4 | 96.1 | 5.1 | 10 k+ |
| 33B | IOA/AA/E-1010 | 95/4/1 | S DS-10 | 0.50 | TMPTA | 1.0 | 90 | 1 | 1 | 10 | 41 | 98.3 | 87.7 | 3.1 | 8658 |
| 33C | IOA/AA/E-1010 | 95/4/1 | S DS-10 | 0.50 | TMPTA | 1.0 | 90 | 2 | 1 | 5.0 | 46 | 87.8 | 92.3 | 9.5 | 595 |
| 33D | IOA/AA/E-1010 | 95/4/1 | S DS-10 | 0.50 | TMPTA | 1.0 | 120 | 2 | 1 | 5.0 | 56 | 91.5 | 93.7 | 13.2 | 180 |
| 34 | IOA/AA/E-1010 | 95/4/1 | S DS-10 | 0.53 | CHCl$_3$ | 5.0 | 30 | 5 | 3 | | | — | 28.2 | | 9 |

Examples 35 and 36

Examples 35 and 36 show the effect of polymerizing temperatures on the properties of the resulting PSA articles.

Example 35 was made as Example 15 except the speed of the web was about 5.0 cm/sec (10 fpm) and the drum temperatures and doses were varied as indicated in Table 10.

Example 36 was made as Example 35 except 1.0 part of TMPTA, a crosslinker was added to the precursor emulsion. The doses and average drum temperatures are listed in Table 10.

All of the samples were tested for polymerized coating thickness, peel adhesion, shear strength, tack and gel percent.

TABLE 10A

| | Reactive Materials | | Surfactant | |
|---|---|---|---|---|
| Example | Type | Parts | Type | Parts |
| 35A | IOA/AA/C-4500 | 95/4/1 | S DS-10 | 0.50 |
| 35B | IOA/AA/C-4500 | 95/4/1 | S DS-10 | 0.50 |
| 35C | IOA/AA/C-4500 | 95/4/1 | S DS-10 | 0.50 |
| 35D | IOA/AA/C-4500 | 95/4/1 | S DS-10 | 0.50 |
| 35E | IOA/AA/C-4500 | 95/4/1 | S DS-10 | 0.50 |
| 35F | IOA/AA/C-4500 | 95/4/1 | S DS-10 | 0.50 |
| 35G | IOA/AA/C-4500 | 95/4/1 | S DS-10 | 0.50 |
| 35H | IOA/AA/C-4500 | 95/4/1 | S DS-10 | 0.50 |
| 35I | IOA/AA/C-4500 | 95/4/1 | S DS-10 | 0.50 |
| 35J | IOA/AA/C-4500 | 95/4/1 | S DS-10 | 0.50 |
| 36A | IOA/AA/C-4500 | 95/4/1 | S DS-10 | 0.50 |
| 36B | IOA/AA/C-4500 | 95/4/1 | S DS-10 | 0.50 |
| 36C | IOA/AA/C-4500 | 95/4/1 | S DS-10 | 0.50 |
| 36D | IOA/AA/C-4500 | 95/4/1 | S DS-10 | 0.50 |

TABLE 10B

| Example | TMPTA parts | Temp (° C.) | Dose per pass (Kgy) | # of Passes | Speed (cm/s) | Resid. time (sec) | Thickness (μm) | Peel (N/dm) | Shear (min) | Tack (gram) | Gel % |
|---|---|---|---|---|---|---|---|---|---|---|---|
| 35A | 0 | 8 | 70 | 1 | 5.0 | 2.8 | 36 | 65 t | 0 sp | 762 | 42 |
| 35B | 0 | 8 | 100 | 1 | 5.0 | 2.8 | 48 | 63 t | 0 sp | 1109 | 58 |
| 35C | 0 | 8 | 120 | 1 | 5.0 | 2.8 | 61 | 68 t | 0 sp | 1240 | 69 |
| 35D | 0 | 8 | 150 | 1 | 5.0 | 2.8 | 43 | 60 t | 0 sp | 1019 | 91 |
| 35E | 0 | 19 | 50 | 1 | 5.0 | 2.8 | 33 | 91 t | 0 sp | | 25 |
| 35F | 0 | 19 | 70 | 1 | 5.0 | 2.8 | 38 | 91 t | 0 sp | 1219 | 67 |
| 35G | 0 | 19 | 100 | 1 | 5.0 | 2.8 | 61 | 88 t | 0 sp | 1069 | 55 |
| 35H | 0 | 19 | 120 | 1 | 5.0 | 2.8 | 64 | 78 t | 0 sp | 1291 | 77 |
| 35I | 0 | 23 | 150 | 1 | 5.0 | 2.8 | 56 | 47 t | 0 sp | 971 | 72 |
| 35J | 0 | 8 | 50 | 1 | 5.0 | 2.8 | 33 | 19 | 62 r | 339 | 94 |
| 36A | 1.0 | 8 | 70 | 1 | 5.0 | 2.8 | 28 | 9 | 51 r | 397 | 96 |
| 36B | 1.0 | 8 | 100 | 1 | 5.0 | 2.8 | 38 | 14 | 110 r | 483 | 93 |
| 36C | 1.0 | 8 | 120 | 1 | 5.0 | 2.8 | 48 | 15 | 84 r | 419 | 92 |
| 36D | 1.0 | 8 | 150 | 1 | 5.0 | 2.8 | 51 | 12 | 292 r | 531 | 94 |

Examples 37–43

Examples 37–43 illustrate the effect of different thickeners on the resulting pressure-sensitive articles.

Examples 37–38 were made in a manner similar to Example 36 except (1) a crosslinker, TMPTA was added in the amount of 0.2 part (2) thickeners were added as shown in Table 11B; and (3) the processing conditions were as shown in Table 11B. Examples 39–42 were made in a manner similar to Examples 37–38 except 1.0 part of TMPTA was used instead of 0.2 parts. The differing types and amounts of thickener and process conditions are listed in Table 11. Example 43 was made as Example 42 except (1) no crosslinker was used; and (2) the thickener was a partially polymerized syrup added in the amount of 10 parts per 100 parts IOA/AA/CHEMLINK 4500. The syrup was made by mixing, in a glass vessel, a blend of IOA and AA, in a weight ratio of 90:10, with a photoinitiator, IRGACURE 651, in the amount of 0.04 parts per 100 parts IOA/AA. After the mixture was purged with a stream of nitrogen gas for five minutes, the degassed mixture, which was maintained in a nitrogen atmosphere to exclude oxygen, was exposed to UV light radiation from a low intensity (15 watt) blacklight source (available from General Electric)until the solution thickened to a syrup with a viscosity of about 500 centipoise.

Each sample was measured for adhesive thickness, peel adhesion, shear strength and tack.

Examples 44–46

Examples 44–46 illustrate the effect of polymeric suspending agent on the resulting pressure-sensitive articles.

Example 44 was made as in Example 1 except (1) NVP was added as a second free-radically copolymerizable material, (2) ACRYSOL A3, a polymeric suspending agent was added, (3) the accelerated electron source voltage was 220 keV, and (4) the substrates and process conditions varied as shown in Table 12.

Example 45 was made as Example 44 except (1) VINOL 350 was added as a polymeric suspending agent; (3) the source voltage was 220 keV, and (4) the substrates and process conditions were as described in Table 12.

Example 46 was made as Example 45 except the surfactant was TEXAPON L-100.

Each example was measured for peel adhesion, shear strength and tack.

TABLE 11A

| | Reactive Materials | | Surfactant | |
|---|---|---|---|---|
| Example | Type | Parts | Type | Parts |
| 37 | IOA/AA/C-4500 | 95/4/1 | S DS-10 | 0.53 |
| 38 | IOA/AA/C-4500 | 95/4/1 | S DS-10 | 0.53 |
| 39 | IOA/AA/C-4500 | 95/4/1 | S DS-10 | 0.53 |
| 40 | IOA/AA/C-4500 | 95/4/1 | S DS-10 | 0.53 |
| 41 | IOA/AA/C-4500 | 95/4/1 | S DS-10 | 0.53 |
| 42 | IOA/AA/C-4500 | 95/4/1 | S DS-10 | 0.53 |
| 43 | IOA/AA/C-4500 | 95/4/1 | S DS-10 | 0.50 |

TABLE 11B

| Example | TMPTA parts | Thickener type | parts | Passes | Dose per pass (kGy) | Speed (cm/sec) | Resid. time (sec) | Thickness (μm) | Peel (N/dm) | Shear (min) |
|---|---|---|---|---|---|---|---|---|---|---|
| 37 | 0.2 | UCAR polyphobe 104 | 0.43 | 2 | 50 | 5.0 | 5.6 | — | 40.9 | 13/20 |
| 38 | 0.2 | NALCO 2327 | 1.0 | 2 | 50 | 5.0 | 5.6 | 50.8 | 28.8 | 128/137 |
| 39 | 1.0 | SNOWTEX UP | 2.5 | 2 | 50 | 5.0 | 5.6 | 55.9 | 1.1 | 43/10 k+ |
| 40 | 1.0 | corn starch | 2.5 | 2 | 50 | 5.0 | 5.6 | 30.5 | 10.9 | 21/24 |
| 41 | 1.0 | CAB-O-SIL M5 | 2.5 | 2 | 50 | 5.0 | 5.6 | 40.6 | 20.5 | 6/6 |
| 42 | 1.0 | NALCO 1034A | 2.5 | 2 | 50 | 5.0 | 5.6 | 53.3 | 45.3 | 45/45 |
| 43 | none | syrup | 10 | 2 | 50 | 5.0 | 5.6 | — | 7.1 | 10 k+ |

TABLE 12

| Example | Reactive Materials Type | Parts | Surfactant Type | Parts | Suspending Agent Type | Parts | Substrate | # of Passes | Dose per pass (kGy) | Speed (cm/s) | Resid. time (sec) | Peel (N/dm) | Shear (min) | Tack (gram) |
|---|---|---|---|---|---|---|---|---|---|---|---|---|---|---|
| 44A | IOA/NVP/AA | 95/4/1 | S DS-10 | 0.53 | ACRYSOL A3 | 1 | treated PET | 5 | 10 | 12.7 | 5.51 | 33.8 | 6 r | 256 |
| 44B | IOA/NVP/AA | 95/4/1 | S DS-10 | 0.53 | ACRYSOL A3 | 1 | PET | 5 | 10 | 12.7 | 5.51 | 54.7 | 3 | 545 |
| 45 | IOA/NVP/AA | 95/4/1 | SDS-10 | 0.53 | VINOL 350 | 1 | treated PET | 1 | 200 | 5.1 | 2.76 | 10.7 | 3 | — |
| 46 | IOA/NVP/AA | 95/4/1 | TL-100 | 0.50 | VINOL 350 | 1 | treated PET | 1 | 200 | 5.1 | 2.76 | 3.3 | 19 | — |

Examples 47–53

Examples 47–53 illustrate the effect of chain transfer agents on the resulting pressure-sensitive tapes.

Examples 47A & B were made in a manner similar to Example 35 except (1) the source voltage was 220 keV and (2) the process conditions varied as shown in Table 13. Examples 48–53 were made as Examples 47A and 47B except (1) different chain transfer agent types and amounts were added and (2) the number of passes varied as listed in Table 13.

Each example was measured for adhesive thickness, peel adhesion, shear strength and tack.

listed in Table 14; (2) in Examples 59 & 63, NVP was used in place of AA; (3) in Example 63 AM-90G was used instead of CHEMLINK 4500; and (4) in Examples 60–62, 64 and 65, a third free-radically copolymerizable monomer was added.

Examples 66–68 were made as in Example 61 except (1) 5 passes were used instead of 3; and (2) for examples 66 and 68 the free-radically copolymerizable monomer ACM was replaced with NVP and HEA, respectively.

Each example was measured for peel adhesion, shear strength and tack.

TABLE 13

| Example | Reactive Materials Type | Parts | Surfactant Type | Parts | Chain Transfer Agent Type | Parts | # of passes | Dose per pass (kGy) | Speed (cm/s) | Resid. time (sec) | Peel (N/dm) | Shear (min) | Tack (gram) |
|---|---|---|---|---|---|---|---|---|---|---|---|---|---|
| 47A | IOA/AA/C-4500 | 95/4/1 | S DS-10 | 0.53 | none | — | 3 | 10 | 12.7 | 3.31 | 23.6 | 35 | 590 |
| 47B | IOA/AA/C-4500 | 95/4/1 | S DS-10 | 0.53 | none | — | 4 | 10 | 12.7 | 4.40 | 18.8 | 28 | — |
| 48 | IOA/AA/C-4500 | 95/4/1 | S DS-10 | 0.53 | CBr$_4$ | 0.2 | 3 | 10 | 12.7 | 3.31 | 29.0 | 1 | 576 |
| 49 | IOA/AA/C-4500 | 95/4/1 | S DS-10 | 0.53 | CBr$_4$ | 0.4 | 4 | 10 | 12.7 | 4.40 | 29.0 | 9 | — |
| 50 | IOA/AA/C-4500 | 95/4/1 | S DS-10 | 0.53 | IOTG | 0.2 | 3 | 10 | 12.7 | 3.31 | 26.1 | 0 | 656 |
| 51 | IOA/AA/C-4500 | 95/4/1 | S DS-10 | 0.53 | IOTG | 0.4 | 4 | 10 | 12.7 | 4.40 | 20.8 | 18 | — |
| 52A | IOA/AA/C-4500 | 95/4/1 | S DS-10 | 0.53 | n-DM | 0.2 | 3 | 10 | 12.7 | 3.31 | 36.8 | 1 | — |
| 52B | IOA/AA/C-4500 | 95/4/1 | S DS-10 | 0.53 | n-DM | 0.2 | 4 | 10 | 12.7 | 4.40 | 35.3 | 1 | — |
| 53A | IOA/AA/C-4500 | 95/4/1 | S DS-10 | 0.53 | PTTG | 0.2 | 5 | 10 | 12.7 | 5.50 | 43.3 | 0 | 748 |
| 53B | IOA/AA/C-4500 | 95/4/1 | S DS-10 | 0.53 | PTTG | 0.2 | 4 | 20 | 12.7 | 4.40 | 36.2 | 13 | 767 |

Examples 54–68

Examples 54–68 illustrate the effect changing a number of variables on the resulting pressure-sensitive tapes.

Examples 54–58 were made in a manner similar to Example 21 except: (1) the surfactant was SIPONIC Y-500-70 and the dose per pass was 70 kGy; (2) in Examples 54 and 55, the free-radically copolymerizable material was AM-90G and EOEA, respectively; (3) in Examples 56–58, the acrylate monomer was nBA, TDA and ENPA, respectively and the weight ratio of acrylate monomer/AA was 95/5, 98/2 and 98/2, respectively.

Examples 61–65 were made in a manner similar to Example 6A except: (1) the process parameters were as

TABLE 14

| Example | Reactive Materials Type | parts | Surfactant Type | Parts | TMPTA parts | # of Passes | Dose per pass (kGy) | Speed (cm/s) | Res. Time (sec.) | Peel (N/dm) | Shear (min) | Tack (gram) |
|---|---|---|---|---|---|---|---|---|---|---|---|---|
| 54 | IOA/AM-90G | 96/4 | S Y-500-70 | 1 | 1 | 2 | 70 | 5.0 | 5.6 | 0.92 | 24/24 | 707 |
| 55 | IOA/EOEA | 96/4 | S Y-500-70 | 1 | 1 | 2 | 70 | 5.0 | 5.6 | 0.79 | 9/14 | 743 |
| 56 | nBA/AA | 95/5 | S Y-500-70 | 1 | 1 | 1 | 70 | 5.0 | 5.6 | 22.9 | 10 k+ | 818 |
| 57 | TDA/AA | 98/2 | S Y-500-70 | 1 | 1 | 2 | 70 | 5.0 | 5.6 | 5.0 | 749/1304 | — |
| 58 | ENPA/AA | 98/2 | S Y-500-70 | 1 | 1 | 2 | 70 | 5.0 | 5.6 | 3.3 | 10 k+ | — |
| 59 | IOA/NVP/C-4500 | 9514/1 | S Y-500-70 | 0.5 | 0 | 5 | 10 | 12.7 | 5.51 | 66.7 | 17 sp | 737 |
| 60 | IOA/AA/B-CEA/C-4500 | 93/4/2/1 | S DS-10 | 0.5 | 0 | 3 | 30 | 5.0 | 3.31 | 20.5 | 2 | 595 |
| 61 | IOA/ACM/AA/C-4500 | 94/4/1/1 | S DS-10 | 0.5 | 0 | 3 | 10 | 12.7 | 3.31 | 5.9 | 11 | 8 |
| 62 | IOA/2-EHA/AA/C-4500 | 94/4/1/1 | S DS-10 | 0.5 | 0 | 3 | 10 | 12.7 | 3.31 | 42.5 | 1 sp | 581 |
| 63 | IOA/NVP/AM-90G | 90/5/5 | S DS-10 | 0.5 | 0 | 1 | 50 | 5.0 | 2.8 | 17.6 | 9/33 | — |
| 64 | IOA/AA/VAc/C-4500 | 95/2/2/1 | S DS-10 | 0.5 | 0 | 1 | 50 | 5.0 | 2.8 | 30.1 | 15/17 | — |
| 65 | IOA/AA/CW-750/C-4500 | 93/4/2/1 | S DS-10 | 0.5 | 1 | 2 | 50 | 5.0 | 5.6 | 29.9 | 29/30 | — |
| 66 | IOA/NVP/AA/C-4500 | 94/4/1/1 | S DS-10 | 0.5 | 0 | 5 | 10 | 12.7 | 5.51 | 62.5 | 1 | 850 |
| 67 | IOA/ACM/AA/C-4500 | 94/4/1/1 | S DS-10 | 0.5 | 0 | 5 | 10 | 12.7 | 5.51 | 6.6 | 0 | 155 |
| 68 | IOA/HEA/AA/C-4500 | 94/4/1/1 | S DS-10 | 0.5 | 0 | 5 | 10 | 12.7 | 5.51 | 43.8 | 13 | 355 |

Examples 69–83

Examples 69–83 illustrate the effect of adding tackifiers to different precursor emulsion formulations.

Examples 69–71 were made as in Example 1 except (1) the source voltage was 220 keV; (2) the process conditions varied as shown in Table 15; (3) tackifier was added a shown in Table 13; (4) in Example 69, the surfactant was 0.5 part SIPONATE DS-10; (5) in Example 70, the surfactant was 5.0 parts SAM-211-80; (6) in Example 71, the surfactant was 1.0 part HS-10.

Examples 72–83 were made as Example 26A except (1) the accelerated electron source was a CB-300 ELECTROCURTAIN at a voltage of 220 keV; (2) the surfactant amount was 0.53; (3) tackifier was added as shown in Table 15; and (4) processing conditions varied as shown in Table 15.

Each example was measured for adhesive thickness, peel adhesion and shear strength.

TABLE 15

| Example | Reactive Materials Type | Parts | Surfactant Type | Parts | Tackifier Type | Parts | TMPTA Parts | # of Passes | Dose (kGy) | Speed (cm/s) | Res. time (sec) | Peel (N/dm) | Shear (min) |
|---|---|---|---|---|---|---|---|---|---|---|---|---|---|
| 69 | IOA/AA | 96/4 | S DS-10 | 0.5 | PICCOLYTE A75 | 1.0 | 0 | 3 | 50/50/20 | 5.0/5.0/12.7 | 6.7 | 20.2 | 21/35 |
| 70 | IOA/AA | 96/4 | SAM-221 | 5.0 | PICCOLYTE A75 | 5.0 | 0 | 3 | 50/50/20 | 5.0/5.0/12.7 | 6.7 | 31.5 | 14/15 |
| 71 | IOA/AA | 96/4 | HS-10 | | PICCOLYTE A75 | 1.0 | 0 | 3 | 40/30/30 | 12.7 | 3.3 | 26.3 | 9/10 |
| 72A | IOA/AA/C-4500 | 95/4/1 | TL-100 | 0.5 | PICCOLYTE A75 | 1.0 | 0 | 3 | 50/50/20 | 5.0/5.0/12.7 | 6.7 | 3.0 | 735/1344 |
| 72B | IOA/AA/C-4500 | 95/4/I | TL-100 | 0.5 | PICCOLYTE A75 | 1.0 | 0 | 3 | 40/30/30 | 12.7 | 3.3 | 3.7 | 1207/2494 |
| 73 | IOA/AA/C-4500 | 95/4/1 | S DS-10 | 0.5 | none | — | 1 | 3 | 50/50/20 | 5.0/5.0/12.7 | 6.7 | 2.1 | 9560+/9559+ |
| 74 | IOA/AA/C-4500 | 95/4/1 | S DS-10 | 0.5 | WINGTACK PLUS | 1.0 | 1 | 3 | 50/50/20 | 5.0/5.0/12.7 | 6.7 | 17 | 24/32 |

TABLE 15-continued

| Exam-ple | Reactive Materials | | Surfactant | | Tackifier | | TMPTA | # of | Dose | Speed | Res. time | Peel | Shear |
|---|---|---|---|---|---|---|---|---|---|---|---|---|---|
| | Type | Parts | Type | Parts | Type | Parts | Parts | Passes | (kGy) | (cm/s) | (sec) | (N/dm) | (min) |
| 75 | IOA/AA/C-4500 | 95/4/1 | S DS-10 | 0.5 | WINGTACK PLUS | 3.0 | 1 | 3 | 50/50/20 | 5.0/5.0/12.7 | 6.7 | 5.1 | 506/1000 |
| 76 | IOA/AA/C-4500 | 95/4/1 | S DS-10 | 0.5 | WINGTACK PLUS | 5.0 | 1 | 3 | 50/50/20 | 5.0/5.0/12.7 | 6.7 | 6.4 | 53/124 |
| 77 | IOA/AA/C-4500 | 95/4/1 | S DS-10 | 0.5 | WINGTACK PLUS | 7.0 | 1 | 3 | 50/50/20 | 5.0/5.0/12.7 | 6.7 | 8.9 | 691/846 |
| 78 | IOA/AA/C-4500 | 95/4/1 | S DS-10 | 0.5 | WINGTACK PLUS | 9.0 | 1 | 3 | 50/50/20 | 5.0/5.0/12.7 | 6.7 | 9.2 | 6/264 |
| 79 | IOA/AA/C-4500 | 95/4/1 | S DS-10 | 0.5 | APKON P-90 | 3.0 | 1 | 3 | 50/50/20 | 5.0/5.0/12.7 | 6.7 | 4.5 | 6613/9587+ |
| 80 | IOA/AA/C-4500 | 95/4/1 | S DS-10 | 0.5 | EASTOTAC H-100R | 3.0 | 1 | 3 | 50/50/20 | 5.0/5.0/12.7 | 6.7 | 5.1 | 457/933 |
| 81 | IOA/AA/C-4500 | 95/4/1 | S DS-10 | 0.5 | FORAL 85 | 3.0 | 1 | 3 | 50/50/20 | 5.0/5.0/12.7 | 6.7 | 6.8 | 665/1203 |
| 82 | IOA/AA/C-4500 | 95/4/1 | S DS-10 | 0.5 | ESCOREZ 1310 | 3.0 | 1 | 3 | 50/50/20 | 5.0 | 6.7 | 6.5 | 588/675 |
| 83 | IOA/AA/C-4500 | 95/4/1 | S DS-10 | 0.5 | PICCOLYTE S-115 | 3.0 | 1 | 3 | 50/50/20 | 5.0 | 6.7 | 6.5 | 674/1261 |

Examples 84–87

Examples 84–87 illustrate the effect of percent solids on the resulting pressure-sensitive tapes.

Examples 84–87 were made in a manner similar to Example 8 except the weight percent solids were 70, 60, 50 and 30, respectively and the coated sheets were passed through the accelerated electron source for one pass at a dose of 50 kGy, a speed of 5 cm/sec (10 fpm), and a residence time of 2.8 sec.

The appearance of the polymerized coating was observed and is reported in Table 16.

TABLE 16

| Example | Polymerizable % | Observations |
|---|---|---|
| 84 | 70 | high viscosity, dried well after 1 pass |
| 85 | 60 | high viscosity, dried well after 1 pass |
| 86 | 50 | low viscosity, visible aqueous phase, dripped off substrate after 1 pass |
| 87 | 30 | very low viscosity, visible aqueous phase, dripped off substrate after 1 pass |

As indicated, the emulsions of this invention are typically made with a higher polymerizable content than those of batch emulsions, which typically have an polymerizable content of up to 55%. Advantageously, a high polymerizable content provides a viscosity that makes it easy to coat the precursor emulsion and to control the coating thickness. The high polymerizable content also greatly reduces any heat or time needed to obtain a dry polymerized coating because the small amount of water used to make the emulsion is usually evaporated by the heat of polymerization.

A lower solids emulsion will have a lower viscosity, but may still be used with the method of the invention. To overcome the problems of working with a low viscosity material, the emulsion may be polymerized soon after being coated on the substrate (i.e., before the emulsion flows off the substrate) or the viscosity of the emulsion may be increased by adding a thickener or by partially prepolymerizing the reactive materials of the emulsion.

Examples 88–92

Examples 88–92 illustrate the effect of photoinitiators on the resulting pressure-sensitive tapes.

Example 88 was made in a manner similar to Example 26 except (1) a photoinitiator, IRGACURE 2959, was added to the unpolymerized emulsion in the amount of 0.2 parts, (2) the accelerated electron beam source was a CB-300 ELECTROCURTAIN and source voltage was 220 keV; and (3) the process conditions were as shown in Table 17.

Example 89 was made as Example 88 except the precursor emulsion (1) did not contain C-4500 and (2) contained 2.0 parts of TEXAPON L-100 instead of 0.5 parts SIPONATE DS-10. Examples 90 and 92 were made as in Example 89 except (1) the amount of surfactant was 3.0 parts and 1.0 parts, respectively, and (2) the dose was varied as shown in Table 17.

Example 92 was made as Example 90 except the photoinitiator used was IRGACURE 184 instead of IRGACURE 2959 and the dose was changed as shown in Table 17.

All samples had an polymerizable content of 70%.

Each sample was measured for gel percent, coating thickness, peel adhesion and shear strength. Example 26B and 27 were added for comparative purposes.

TABLE 17A

| | Reactive Materials | | Surfactant | |
|---|---|---|---|---|
| Example | Type | Parts | Type | Parts |
| 88 | IOA/AA/C-4500 | 95/4/1 | S DS-10 | 0.5 |
| 26B | IOA/AA/C-4500 | 95/4/1 | S DS-10 | 0.5 |
| 89 | IOA/AA | 96/4 | TL-100 | 2.0 |
| 27 | IOA/AA | 96/4 | TL-100 | 2.0 |
| 90 | IOA/AA | 96/4 | TL-100 | 3.0 |
| 91 | IOA/AA | 96/4 | TL-100 | 1.0 |
| 92 | IOA/AA | 96/4 | TL-100 | 2.0 |

TABLE 17B

| Example | TMPTA parts | Photoinitiator | # of Passes | Dose per pass (kGy) | Speed (cm/s) | Res. time (sec) | Gel % | Thickness (μm) | Peel (N/dm) | Shear (min) | Weight % Polymer % |
|---|---|---|---|---|---|---|---|---|---|---|---|
| 88 | 1.0 | IRGACURE 2959 | 2 | 50/70 | 5.0 | 5.6 | 94.1 | 44 | 9.3 | 553/629 | 98.0 |
| 26B | 1.0 | none | 2 | 50/70 | 5.0 | 5.6 | 93.6 | 52 | 8.2 | 481/571 | 96.5 |
| 89 | 1.0 | IRGACURE 2959 | 2 | 50/70 | 5.0 | 5.6 | 93.1 | 52 | 2.5 | 2724/10 k+ | 96.8 |
| 27 | 1.0 | none | 2 | 50/70 | 5.0 | 5.6 | — | 55 | 8.6 | 368/552 | 95.3 |
| 90 | 1.0 | IRGACURE 2959 | 2 | 50/70 | 5.0 | 5.6 | 93.0 | 51 | 2.2 | 197/10 k+ | 97.7 |
| 91 | 1.0 | IRGACURE 2959 | 2 | 60/60 | 5.0 | 5.6 | 91.3 | 50 | 3.7 | 195/227 | 100.0 |
| 92 | 1.0 | IRGACURE 184 | 2 | 60/60 | 5.0 | 5.6 | 96.8 | 52 | — | 0/104 | 98.8 |

Examples 93–96

Examples 93–96 illustrate the adhesion of an e-beam polymerized emulsion-based pressure sensitive adhesive to a polypropylene/polyethylene film. Example 93 was made in a manner similar to Example 6A except: (1) 1 part TMPTA was added, (2) the dose per pass was 7 kGy (2 passes were made), (3) the residence time was 5.6 seconds, and (4) the speed was 5.0 cm/sec. Examples 94–96 were made in a manner similar to Example 93 except as shown in Table 18.

The samples were subjected to a 90° Peel Adhesion test. Samples were slit to a width of 2.54 cm (1 inch) and self-adhered to a smooth stainless steel plate under the weight of a 2.04 kg hard rubber covered steel roller, 2 passes in each direction, leaving one end of the sample free. After dwelling at 23° C. for the time indicated in Table 18, the 90° Peel Adhesion was measured by moving the free end of the tape away from the steel plate at a 90° angle and at a rate of about 0.5 cm/sec (12 in/min) (using a tensile tester).

The results of the Peel Adhesion test are shown in Table 18.

Washability was evaluated to determine solvent resistance, including water resistance. PSA tape samples of 12 cm×15 cm were place in a bowl, adhesive side up. The bowl was then filled with dirt (38.4% peat, 18.0% cement, 18.0% caolin, 18.0% silicious earth, 6.25% mineral oil, 1.05% soot, and 0.30% ferrous oxide) and shaken for 15 minutes. Excess dirt was blown away with air. The samples were stored and subjected to conditions that varied as to length of time, temperature, and solvent in which the tape sample was submerged. Table 19 sets forth the number of days the test was performed, the temperature at which the test was performed, and the solvent used.

The samples were rated on the extent to which their adhesion changed after being submerged in the solvent. A rating of "5" indicated that the adhesion of the PSA tape did not change under the given test conditions.

TABLE 18

| | Reactive Materials | | Surfactant | | TMPTA parts | 90° Peel (N/dm) | | |
|---|---|---|---|---|---|---|---|---|
| Example | Type | Parts | Type | parts | | 20 min @ room temp. | 24 hours @ room temp. | 3 days @ 70° C. |
| 93 | IOA/AA/C-4500 | 95/4/1 | S DS-10 | 0.5 | 1 | 3.0 | 3.2 | 3.1 |
| 94 | IOA/AA | 96/4 | T L-100 | 2 | 1 | 1.5 | 0.9 | 0.5 |
| 95 | IOA/AA | 96/4 | S DS-10 | 1 | 1 | 3.5 | 3.6 | 3.5 |
| 96 | IOA/AA/C-4500 | 95/4/1 | S DS-10 | 0.5 | 0.75 | 5.5 | 6.3 | 5.9 |

Example 97

Example 97 shows the effect of different solvents on a representative PSA tape made by e-beam irradiation of an acrylate emulsion. Example 97 was made in a manner similar to Example 93 except: (1) the ratio of IOA/AA/C-4500 was 94/5/1, (2) the process conditions were 3 passes with dose rates of 50/50/20 kGy, with a total residence time of 7.7 seconds.

TABLE 19

| | Reactive Materials | | Surfactant | | TMPTA | 7 days 70 C. | 7 days 70 C. | 7 days ambient | 7 days ambient | 24 hours ambient | 24 hours ambient | 24 hours ambient |
|---|---|---|---|---|---|---|---|---|---|---|---|---|
| Example | Type | Parts | Type | Parts | Parts | H2O/soap | H2O | H2O/soap | H2O | IPA | H2O/soap | H2O |
| 97 | IOA/AA/C-4500 | 94/5/1 | S DS-10 | 0.5 | 1 | s | 4 | 5 | 4 | 5 | 4 | 3 |

This invention is not limited to the above embodiments. The claims follow.

What is claimed is:

1. A method for making an acrylate pressure sensitive adhesive article comprising:
   1) providing a substrate;
   2) coating an macroemulsion-based pressure sensitive adhesive precursor on the substrate, said precursor comprising (1) one or more acrylate monomers, (2) one or more free-radically copolymerizable monomers, oligomers, or macromonomers, and (3) one or more surfactants or polymeric suspending agents; and
   3) irradiating the coated substrate with accelerated electrons to polymerize and crosslink the precursor macroemulsion, thereby forming a pressure sensitive adhesive article.

2. The method of claim 1 wherein irradiating the coated substrate further causes the precursor emulsion to graft to the substrate.

3. The method of claim 1 further comprising drying the coated substrate after it is irradiated with accelerated electrons.

4. The method of claim 1 wherein during the irradiation step the formed pressure sensitive adhesive article is dried.

5. The method of claim 1 wherein the precursor emulsion has an polymerizable content of about 50 to about 90 weight percent.

6. The method of claim 1 wherein the precursor emulsion has an polymerizable content of about 65 to about 80 weight percent.

7. The method of claim 1 wherein the precursor emulsion has a viscosity of about 500 to about 10,000 centipoise.

8. The method of claim 1 wherein the precursor emulsion has a viscosity of about 1,500 to about 8,500 centipoise.

9. The method of claim 1 wherein the acrylate monomer is selected from the group consisting of isooctyl acrylate, 2-ethylhexyl acrylate, n-butyl acrylate, dodecyl acrylate, tridecyl acrylate, ethoxylated nonyl phenyl (meth)acrylate and mixtures thereof.

10. The method of claim 1 wherein the precursor emulsion further comprises one or more other additives such as chain transfer agents, thickening agents, crosslinking agents, tackifying agents, or chemical free radical initiators.

11. The method of claim 10 wherein the crosslinking agent is a multifunctional acrylate present in an amount of at least 0.5 parts per 100 parts of the combination of acrylate monomer and free-radically copolymerizable monomer, oligomer or macromonomer in the precursor emulsion.

12. The method of claim 11 wherein the multifunctional acrylate is trimethylopropane triacrylate.

13. The method of claim 11 wherein the multifunctional acrylate is pentaerythritol tetraacrylate.

14. The method of claim 10 wherein the chemical free radical initiator is a photoinitiator.

15. The method of claim 1 wherein the substrate is an untreated or low surface energy material.

16. The method of claim 15 wherein the surface energy of the substrate is less than that of the precursor.

17. The method of claim 1 wherein the precursor contains essentially no chemical free radical initiators.

18. A method of making an acrylate pressure sensitive adhesive coated article wherein the coating has a glass transition temperature of 0° C. or less, comprising:
   1) preparing a polymerizable mixture comprising:
      i) an acrylic acid ester of a non-tertiary alcohol, said alcohol having from 3 to 13 carbon atoms,
      ii) one or more free-radically copolymerizable materials capable of copolymerizing with said acrylic acid ester;
      iii) a multifunctional crosslinker, and
   2) preparing a continuous-water-phase macroemulsion comprising:
      i) water, and
      ii) a surfactant, suspending agent or mixture thereof,
   3) homogenizing said polymerizable mixture and said continuous-water-phase macroemulsion to form a homogeneous viscous oil-in-water macroemulsion;
   4) providing a substrate;
   5) coating said viscous oil-in-water macroemulsion on said substrate; and
   6) irradiating the coated substrate with accelerated electrons to polymerize, crosslink, partially or fully dry, and graft to said substrate, said viscous oil-in-water macroemulsion, thereby forming a pressure sensitive adhesive article.

19. The method of claim 18 wherein the continuous water phase emulsion comprises:
   a) about 0.2 to about 10 parts stabilizer by weight per 100 parts of the combination of items 1)i and 1)ii); and
   b) about 10 to about 50 parts water by weight per 100 parts of the precursor emulsion.

20. The method of claim 18 wherein the polymerizable mixture further comprises one or more additives selected from the group consisting of chain transfer agents, tackifying agents, and chemical free radical initiators.

21. The method of claim 18 wherein the polymerizable mixture further comprises a thickener in an amount of up to about 10 parts per 100 parts by weight of the combination of items 1)i) and 1)ii).

22. The method of claim 21 wherein the thickener is selected from the group consisting of inorganic thickeners and polysaccharide.

23. The method of claim 18 wherein the surfactant is cationic.

24. The method of claim 18 wherein the polymerizable mixture further comprises a prepolymerized syrup in an amount of up to about 100 parts per 100 parts by weight of the combination of items 1)i) and 1)ii).

25. The method of claim 18 wherein items 1)i) and 1)ii) are partially copolymerized prior to being mixed with item 1)iii).

26. A method for making a pressure sensitive acrylate coated article wherein the coating has a glass transition temperature of 0° C. or less, comprising:

a) preparing a polymerizable mixture comprising:
   i) about 80 to about 99 parts by weight, based on 100 parts of the combination of items a)i) and a)ii) herein, of an acrylic acid ester selected from the group consisting of of isooctyl acrylate, 2-ethylhexyl acrylate, n-butyl acrylate, dodecyl acrylate, tridecyl acrylate, ethoxylated nonyl phenyl (meth)acrylate and mixtures thereof;
   ii) up to about 20 parts by weight, based on 100 parts of the combination of items a)i) and a)ii) herein, of a free-radically copolymerizable material selected from the group consisting of acrylic acid, acrylamide, n-vinyl pyrrolidone, and beta carboxy ethyl acrylate;
   iii) 0 to about 10 parts by weight, based on 100 parts of the combination of items a) i) and a)ii) herein, of one or more additive(s) selected from the group consisting of 2-polystyryl ethyl methacrylate macromonomer, polymethylmethacrylate, hydrophobic silica;
   iv) 0 to about 2 parts by weight, based on 100 parts of the combination of items a)i) and a)ii) herein, of a multifunctional crosslinker selected from the group consisting of trimethylol propane triacrylate, hexadiol diacrylate, and pentaerythritol tetracrylate;
   v) 0 to about 5 parts by weight, based on 100 parts of the combination of items a)i) and a)ii) herein, of a thickener selected from the group consisting of starch, hydrophilic silicas, colloidal silica;
   vi) up to about 1 part by weight, based on 100 parts of the combination of items a)i) and a)ii) herein, of a chain transfer agent selected from the group consisting of n-dodecyl mercaptan, isooctyl thioglycolate, carbon tetrabromide;

b) preparing a continuous-water-phase macroemulsion comprising:
   i) about 10 to about 50 parts water by weight, based on the total weight of the combination of a) and b) herein, and
   ii) about 0.5 to about 5 parts by weight, based on 100 parts of the combination of items a)i) and a)ii) herein, of a stabilizer selected from the group consisting of anionic surfactant, cationic surfactant, nonionic surfactant, copolymerizable surfactant, and polymeric suspending agent;

c) forming a viscous oil-in-water macroemulsion by homogenizing said polymerizable mixture and said continuous water phase macroemulsion;

d) providing a substrate;

e) coating said viscous oil-in-water macroemulsion on said substrate; and f) irradiating the coated substrate with accelerated electrons to polymerize, crosslink, partially or fully dry, and graft to said substrate, said viscous oil-in-water macroemulsion, thereby forming a pressure sensitive adhesive article.

* * * * *